(12) United States Patent
Smith

(10) Patent No.: US 6,453,950 B1
(45) Date of Patent: Sep. 24, 2002

(54) TUBE FOR CONVEYING A LIQUID

(76) Inventor: Donald Smith, 32340 Saddle Mountain Dr., Westlake Village, CA (US) 91361

( * ) Notice: Subject to any disclaimer, the term of this patent is extended or adjusted under 35 U.S.C. 154(b) by 0 days.

(21) Appl. No.: 09/723,361

(22) Filed: Nov. 28, 2000

(51) Int. Cl.[7] ................................................. F16L 11/00
(52) U.S. Cl. ....................... 138/115; 138/125; 138/153; 138/DIG. 8; 138/DIG. 11
(58) Field of Search ................... 138/115, 116, 138/125, 153, DIG. 8, DIG. 11; 428/36.91

(56) References Cited

U.S. PATENT DOCUMENTS

| | | | |
|---|---|---|---|
| 385,109 A | * 6/1888 | Garver et al. ................ 138/178 |
| 2,704,556 A | * 3/1955 | Blish | |
| 3,201,861 A | * 8/1965 | Fromson et al. | |
| 3,259,405 A | * 7/1966 | Heller | |
| 3,337,681 A | 8/1967 | Smith | |
| 3,499,972 A | 3/1970 | Smith | |
| 3,619,481 A | 11/1971 | Smith | |
| 3,624,800 A | * 11/1971 | Swick ........................ 138/118 |
| 3,692,926 A | 9/1972 | Smith | |
| 3,792,386 A | * 2/1974 | Schuster et al. ...... 138/DIG. 11 |
| 4,204,309 A | * 5/1980 | Lefrancois ................... 138/115 |
| 4,654,962 A | * 4/1987 | Ben-Dov ...................... 138/115 |
| 4,669,508 A | * 6/1987 | Neaves ................... 138/DIG. 8 |
| 5,285,008 A | * 2/1994 | Sas-Jaworsky et al. ...... 138/115 |
| 5,996,639 A | * 12/1999 | Gans et al. .................. 138/115 |
| 6,029,711 A | * 2/2000 | Koch et al. ................. 138/118 |

* cited by examiner

Primary Examiner—James Hook
(74) Attorney, Agent, or Firm—Thomas W. Secrest

(57) ABSTRACT

A round circular hose has a tendency to kink when extended. Also, a round circular hose can be difficult to form into a coil. With this background I have developed a hose with rigid sides to prevent kinking and for ease for forming into a coil provided with thicker wall sections.

9 Claims, 20 Drawing Sheets

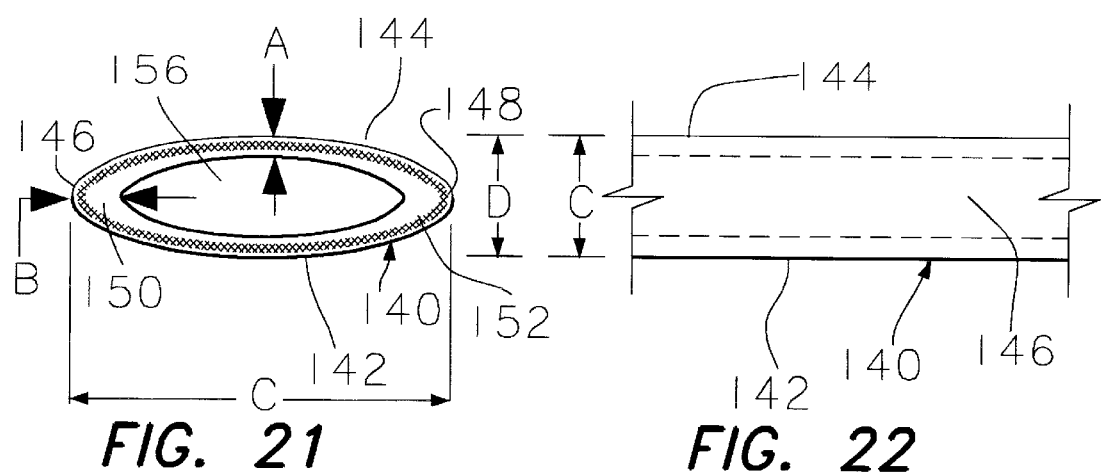
FIG. 21
FIG. 22
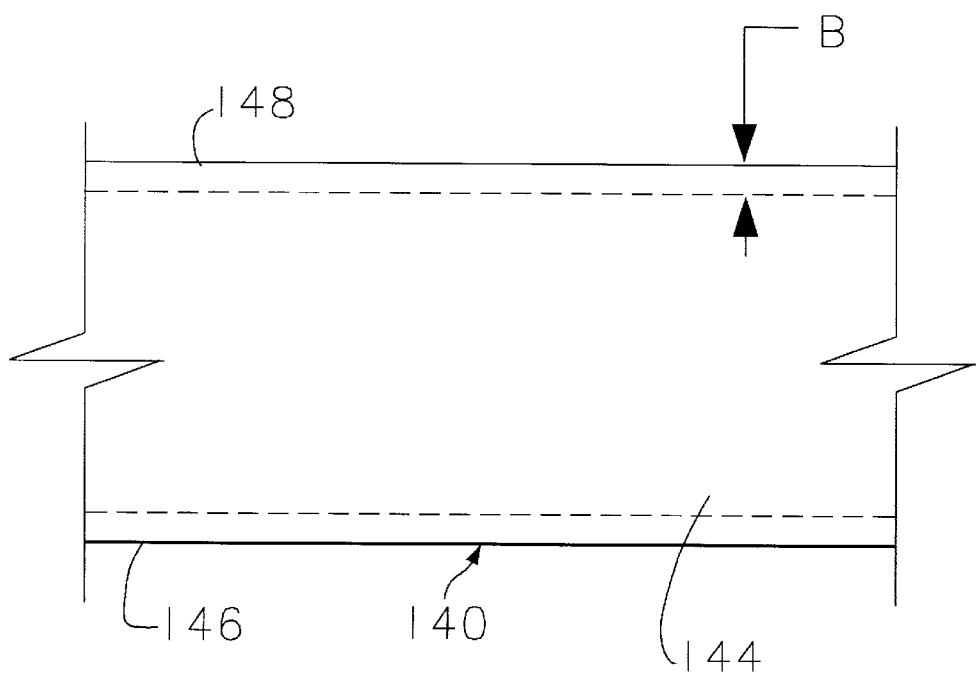
FIG. 23

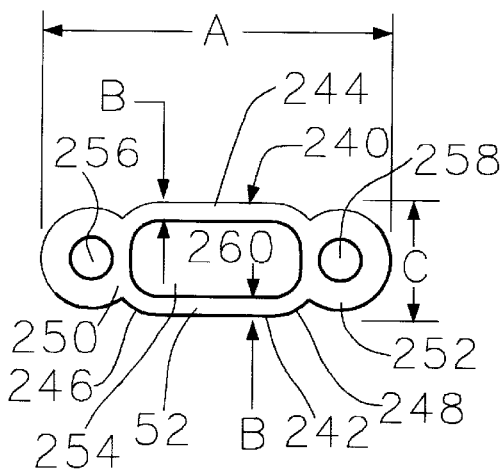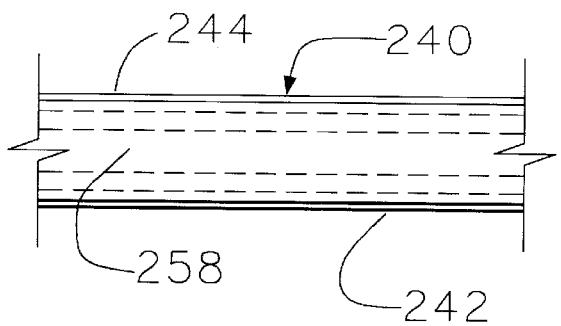
FIG. 35    FIG. 36
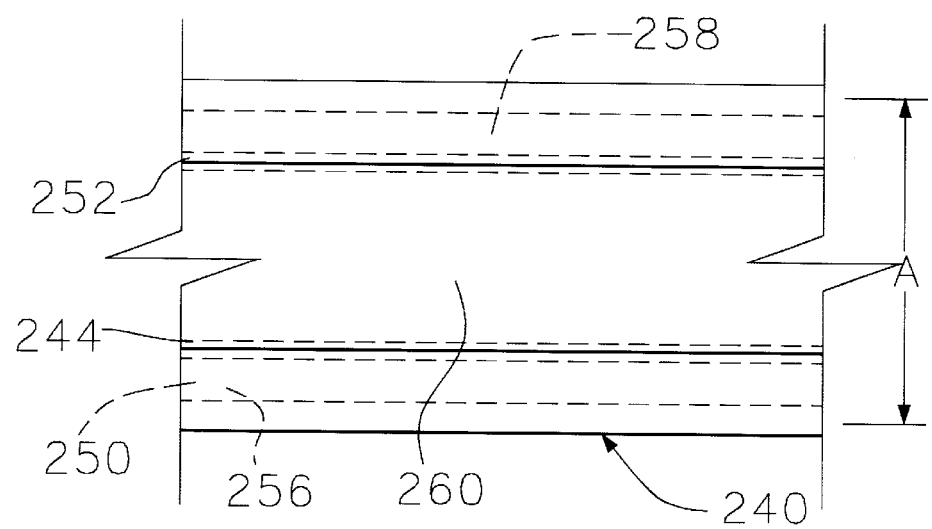
FIG. 37

TUBE FOR CONVEYING A LIQUID

(B) CROSS-REFERENCES TO RELATED PATENT APPLICATIONS (if any)

There are copending patent applications; Ser. No. 08/783,693, filed Jan. 15, 1997; Ser. No. 29/150,502, filed Nov. 26, 2001; Ser. No. 09/992,263, filed Nov. 26, 2001 and U.S. Pat. Nos. 3,337,681; 3,479,972; 3,692,926; 3,706,839; 4,026,02; 4,337,374; 5,568,584; 5,793,924; and 6,177,634.

(C) STATEMENT AS TO RIGHTS TO INVENTIONS MADE UNDER

FEDERALLY SPONSORED RESEARCH AND DEVELOPMENT (if any)

This invention was developed with private funds and there were no federally assisted funds.

(D) REFERENCE TO A "MICROFICHE APPENDIX"

This section is not applicable to this subject matter.

(E) BACKGROUND OF THE INVENTION

1. Field of the Invention

The subject is a tube for conveying a liquid.

An example is a hose for conveying water for a lawn, garden, or to extinguish a fire, or to wash an automotive vehicle, and the like.

2. Description of the Related Art Including Information Disclosed Under 37 CFR 1.97 and 37 CFR 1.98

A patent search was made on the Internet at website http://www.uspto.gov. A conflicting invention was not found in the patent search.

Garden hoses have been used for a number of years.

There are different grades in garden hoses. Garden hoses are generally made from a plastic and there may be imbedded a cloth mesh in the garden hose to add strength. A garden hose, in cross-section is round and approximately one inch in outside diameter. The length of the garden hose can vary but mainly it is 50 feet in length and a number of garden hoses can be connected together to form a longer hose.

A garden hose has a tendency to kink by folding over on itself.

The kink weakens the garden hose and it also restricts the flow of water in the garden hose. A person watering the lawn with a garden hose must remove the kink in the hose to allow the water to flow. It takes time to remove the kink in the garden hose and it is annoying to stop work to remove the kink. This can be important where a person is being employed to water the garden. This employed person must take time to remove the kink and thereby lessens his productive effort.

A garden hose can be wound in a circle or a coil and stored. Many times a kink forms in the circle or coil and it is difficult to keep from forming a kink when winding in a circle or a coil.

Another hose which is frequently used is a fire hose. The fire hose is of canvas and when not in use it is flat. Water in flowing through the fire hose expands the fire hose.

(F) BRIEF SUMMARY OF THE INVENTION

The subject is a tube for conveying a liquid and which tube will, generally, not twist and kink. The tube is sufficiently stiff to not kink and fold back on itself. However, the tube can be made into a coil and stored.

The side walls of the tube are thicker than the top and bottom walls so as to give more rigidity to the tube, and as a result the tube will not kink and fold back on itself.

The thickening of the side walls of the tube can be realized by having outriggers on the tube. The outriggers stiffen the tube and make it more difficult for the tube to kink.

The tube can be manufactured from readily available plastic such as polyvinyl chloride, neoprene, EPDM, vinyl nitrile. Also a low density polyethylene, polypropylene, or Krayton are suitable elastomers.

As the tube can be extruded with the use of these elastomers, the cost to manufacture the tube is a relatively low cost.

Also, these elastomers are light in weight.

The tube has a tendency to lie flat because of thickened side walls due to outriggers or an elliptical configuration.

It takes less space to stock and store the tube in a warehouse or retail store as the tube can readily be wound onto a reel or formed into a coil.

I have found that the tube drags more easily around obstructions than the standard garden hose which in a lateral view is circular.

(G) BRIEF DESCRIPTION OF THE SEVERAL VIEWS OF THE DRAWING(S)

FIGS. 1–4 are drawn to a species of the tube which is of a generally rectangular configuration wherein:

FIG. 1 is an end elevational view of the tube of a rectangular configuration with outriggers at approximately 180 degrees apart;

FIG. 2 is a side elevational view of the tube and shows an outrigger;

FIG. 3 is a bottom plan view of the tube and shows the outriggers at 180 degrees apart;

FIG. 4 is a cross-sectional view of the tube as wound in a coil;

FIGS. 5–8 are for a tube wherein:

FIG. 5 is an end elevational view of the tube of a generally rectangular cross-sectional configuration with two outriggers approximately 180 degrees apart and a central divider;

FIG. 6 is a side elevational view of the tube and shows the outrigger;

FIG. 7 is a top plan view of the tube and shows the two outriggers;

FIG. 8 is an end elevational view of the tube as coiled showing, in cross-section, the generally rectangular configuration of the tube;

FIGS. 9–12 are for a tube wherein:

FIG. 9 is an end elevational view of the generally circular cross-sectional configuration of the tube with two outriggers spaced approximately 180 degrees apart;

FIG. 10 is a side elevational view of the tube with the two outriggers;

FIG. 11 is a top plan view of the tube showing one outrigger;

FIG. 12 is a cross-sectional view of a coil of the tube showing the generally circular cross-sectional configuration and the two outriggers on the tube;

FIGS. 13–16 are for a tube wherein:

FIG. 13 is an end elevational view showing the tube of a generally rectangular configuration;

FIG. 14 is a side elevational view of the tube;

FIG. 15 is a top plan view of the tube;

FIG. 16 is a cross-sectional view of the coil of the tube showing the tube in a generally rectangular cross-sectional configuration;

FIGS. 17–20 are for a tube wherein:

FIG. 17 is an end elevational view of a tube of a generally rectangular configuration wherein the side walls of the tube are thicker than the top and bottom walls of the tube and there is also a reinforcing braid in the tube;

FIG. 18 is a side elevational view of the tube;

FIG. 19 is a top plan view of the tube;

FIG. 20 is a cross-sectional view of the tube in a coil and shows the generally rectangular cross-sectional configuration of the tube;

FIGS. 21–24 are directed to a tube wherein:

FIG. 21 is an end elevational view of the tube and shows the tube in a generally elliptical configuration;

FIG. 22 is a side elevational view of the tube;

FIG. 23 is a top plan view of the tube;

FIG. 24 is cross-sectional view of a coil of the tube and shows many parts of the tube of a generally cross-sectional elliptical configuration;

FIGS. 25–27 are for a clamp for connecting the tube to an inlet for a liquid or connecting the tube to an outlet for the liquid wherein:

FIG. 25 is an end elevational view of the clamp and illustrates the main central longitudinal groove in the two members of the clamp for receiving the tube and, when appropriate, the outrigger grooves for receiving the outriggers on the tube;

FIG. 26 is a side elevational view of the clamp;

FIG. 27 is a top plan view of the clamp;

FIGS. 31–33 are directed to a flexible output nozzle wherein:

FIG. 31 is a side elevational view of the nozzle;

FIG. 32 is an outside end elevational view of the outlet side of a nozzle;

FIG. 33 is an end elevational view the inlet side of the nozzle;

Figure 34:
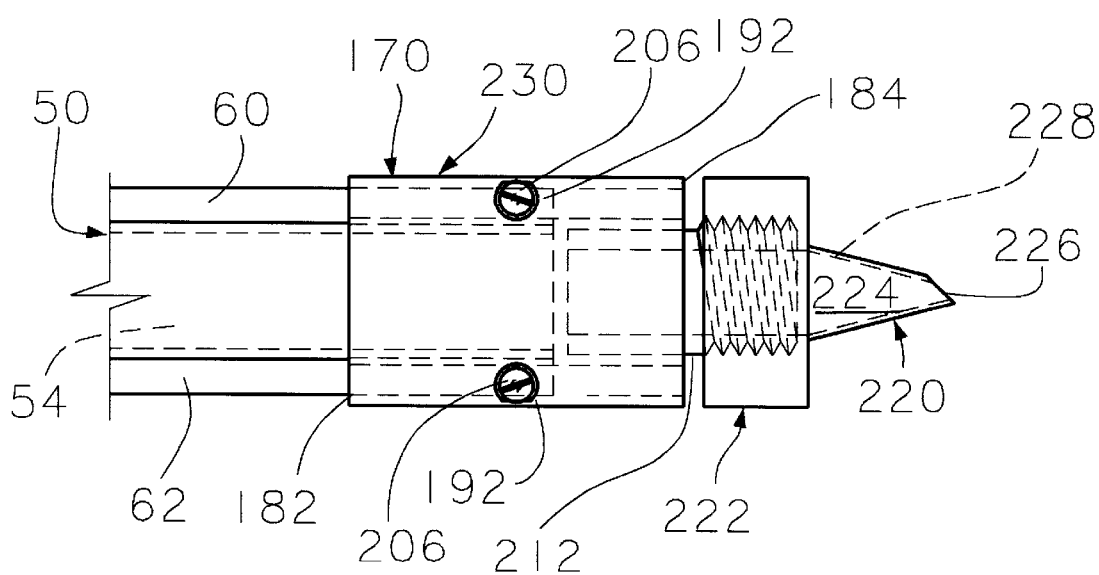
Figure 38:
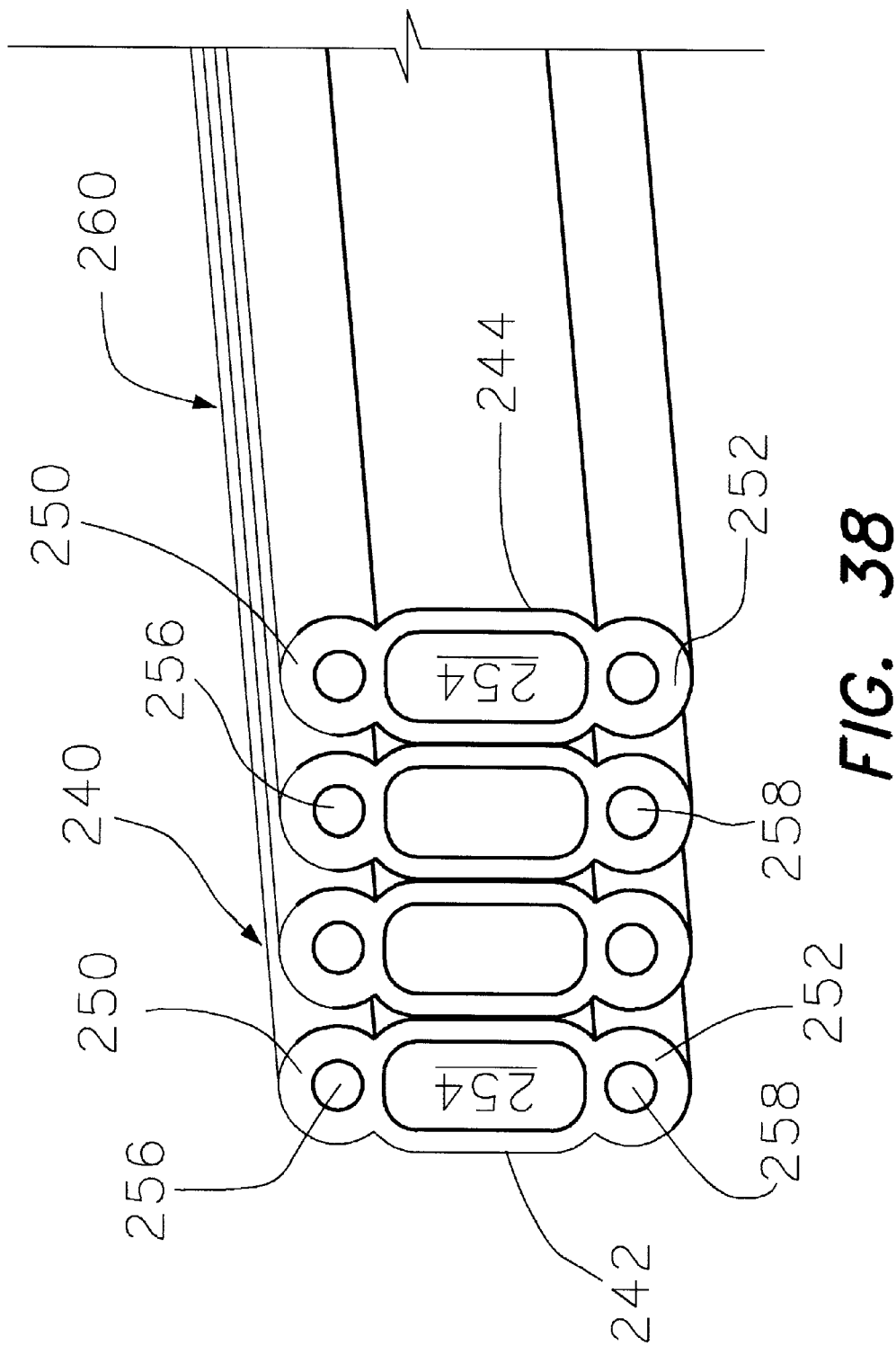
Figures 39, 40:
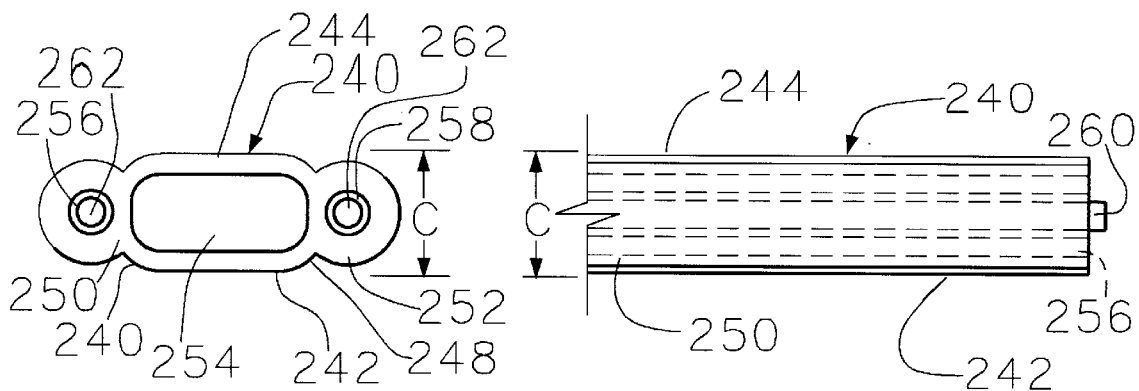
Figure 41:
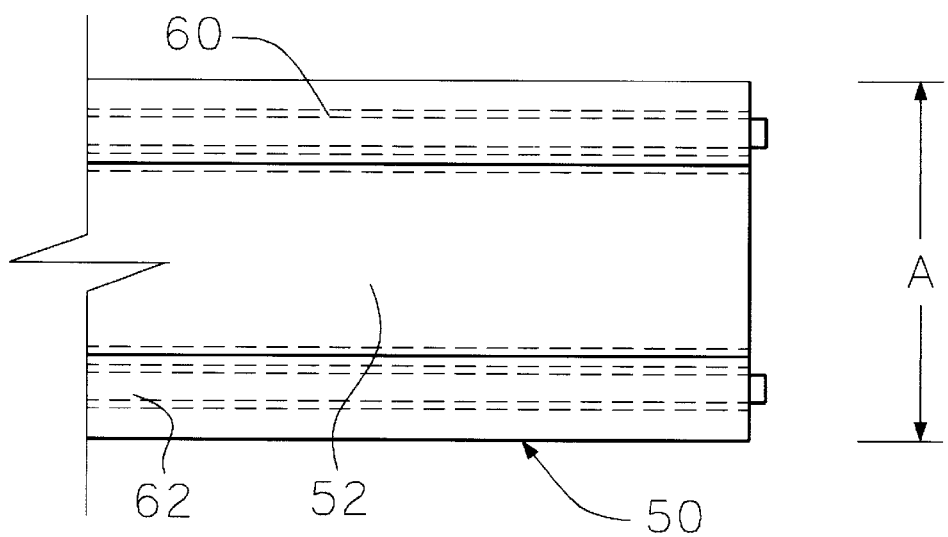
Figure 42:
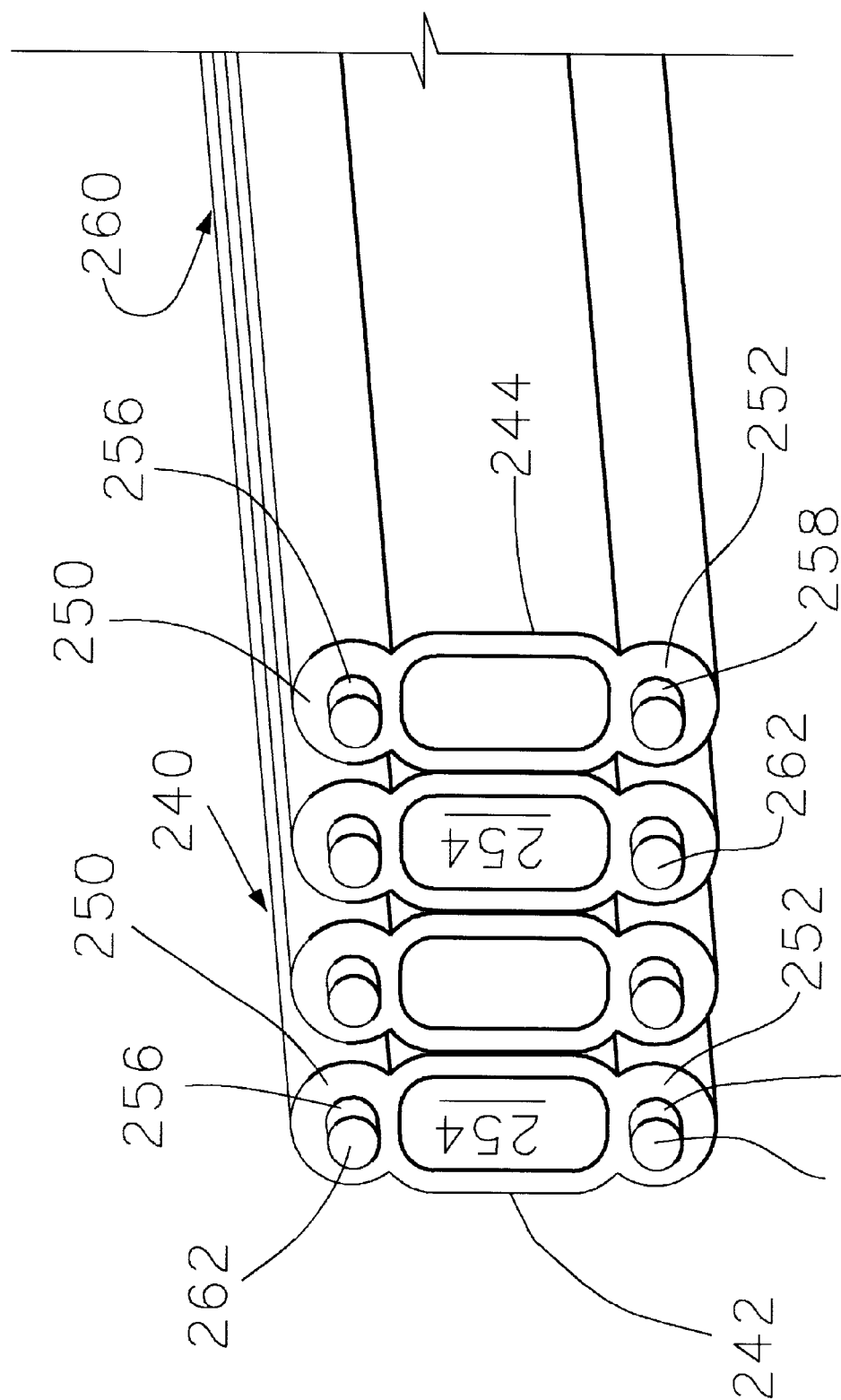

FIG. 34 is a top plan view of the combination of the clamp, the tube, the outlet adaptor, and the flexible outlet nozzle on the outlet adaptor wherein on the left of the clamp the tube is entering into the clamp to transfer liquid into the clamp and on the right of the clamp the outlet adaptor is receiving the liquid for transferring the liquid to the flexible outlet nozzle on the end of the outlet adaptor;

FIGS. 35–38 are drawn to a species of the tube which is of a generally rectangular configuration wherein:

FIG. 35 is an end elevational view of the tube of a rectangular configuration with outriggers at approximately 180 degrees apart and with a passageway at each outrigger;

FIG. 36 is a top plan view of the tube and shows the outriggers;

FIG. 37 is a side elevational view of the tube and shows an outrigger;

FIG. 38 is a cross-sectional view of the tube as wound in a coil;

FIGS. 39–42 are drawn to a species of the tube which is of a generally rectangular configuration wherein:

FIG. 39 is an end elevational view of the tube with a rectangular configuration with outriggers of approximately 180 degrees apart and with a passageway in each outrigger has a stiffening rod in each passageway;

FIG. 40 is a top plan view of the tube and the stiffening rod;

FIG. 41 is a side elevational view of the tube and the outrigger and the stiffening rod;

FIG. 42 is a cross-sectional view of the tube as wound in a coil.

(H) DETAILED DESCRIPTION OF THE INVENTION

With reference to FIGS. 1–4 it is seen that there is a tube 50 having a bottom side 52 and a top side 54.

There is a first curved end 56 connecting 52 and 54.

There is a second curved end 58 connecting 52 and 54.

On the outer surface of the first curved end 56 there is a first outrigger 60.

On the outer end of the second curved end 58 there is a second outrigger 62.

The top side, bottom side, first curved end, and the second curved end have an inside surface and define a central passageway 64.

Figure 1:
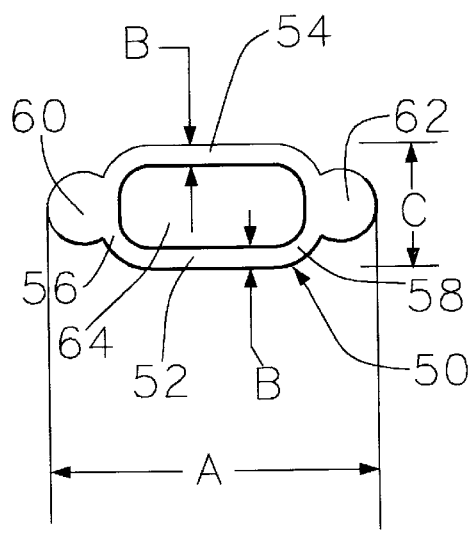
Figure 2:
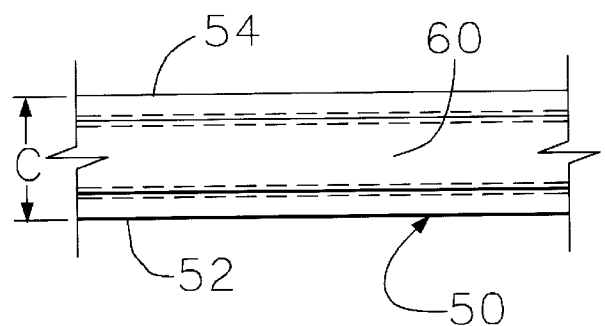
Figure 3:
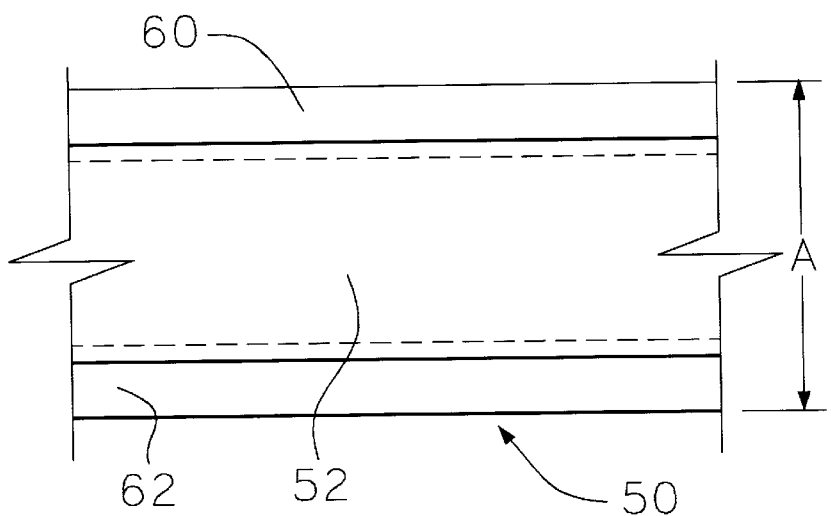
Figure 4:
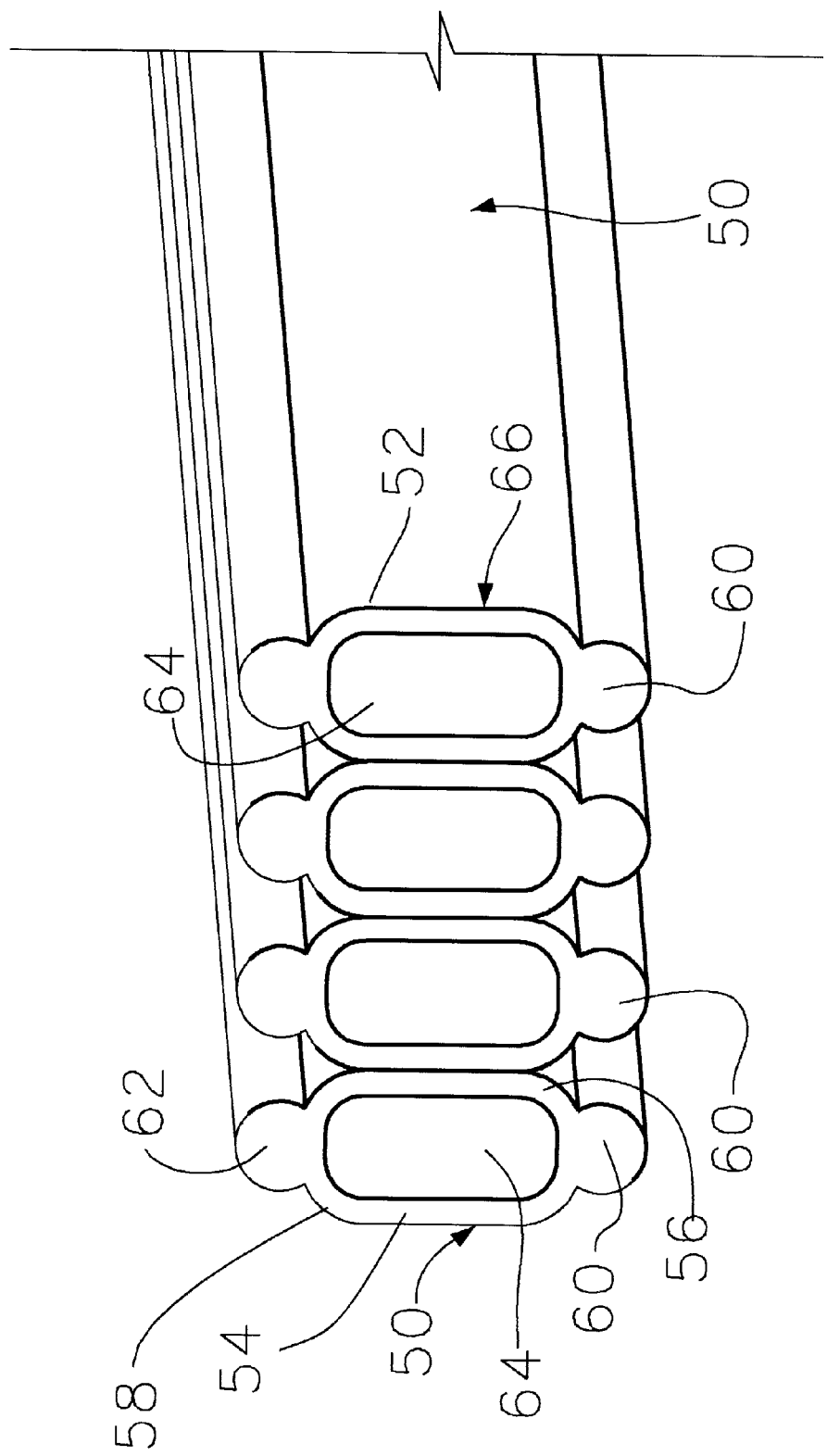
Figure 5:
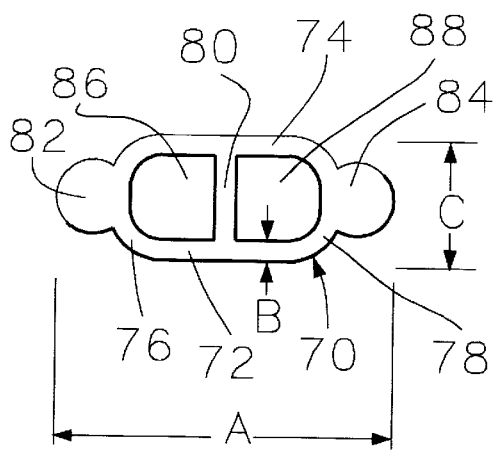
Figure 6:
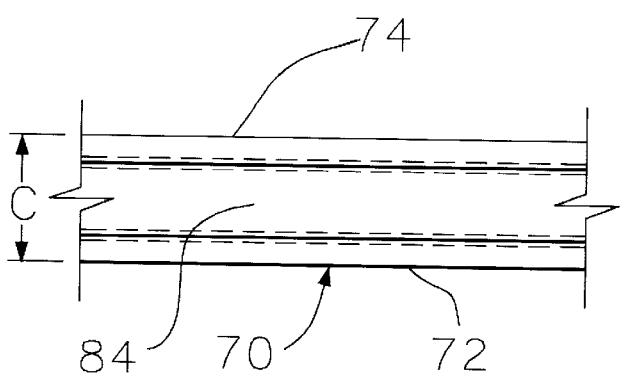
Figure 7:
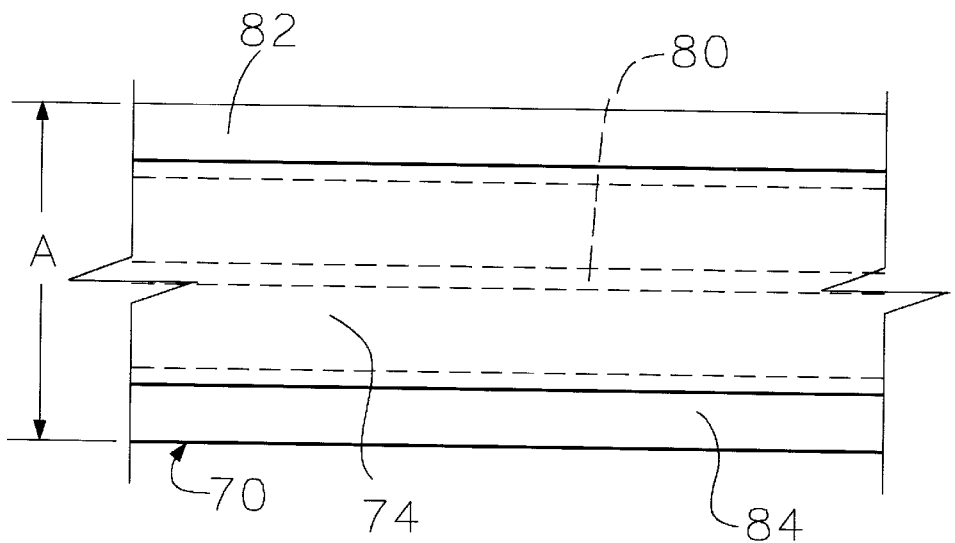
Figure 8:
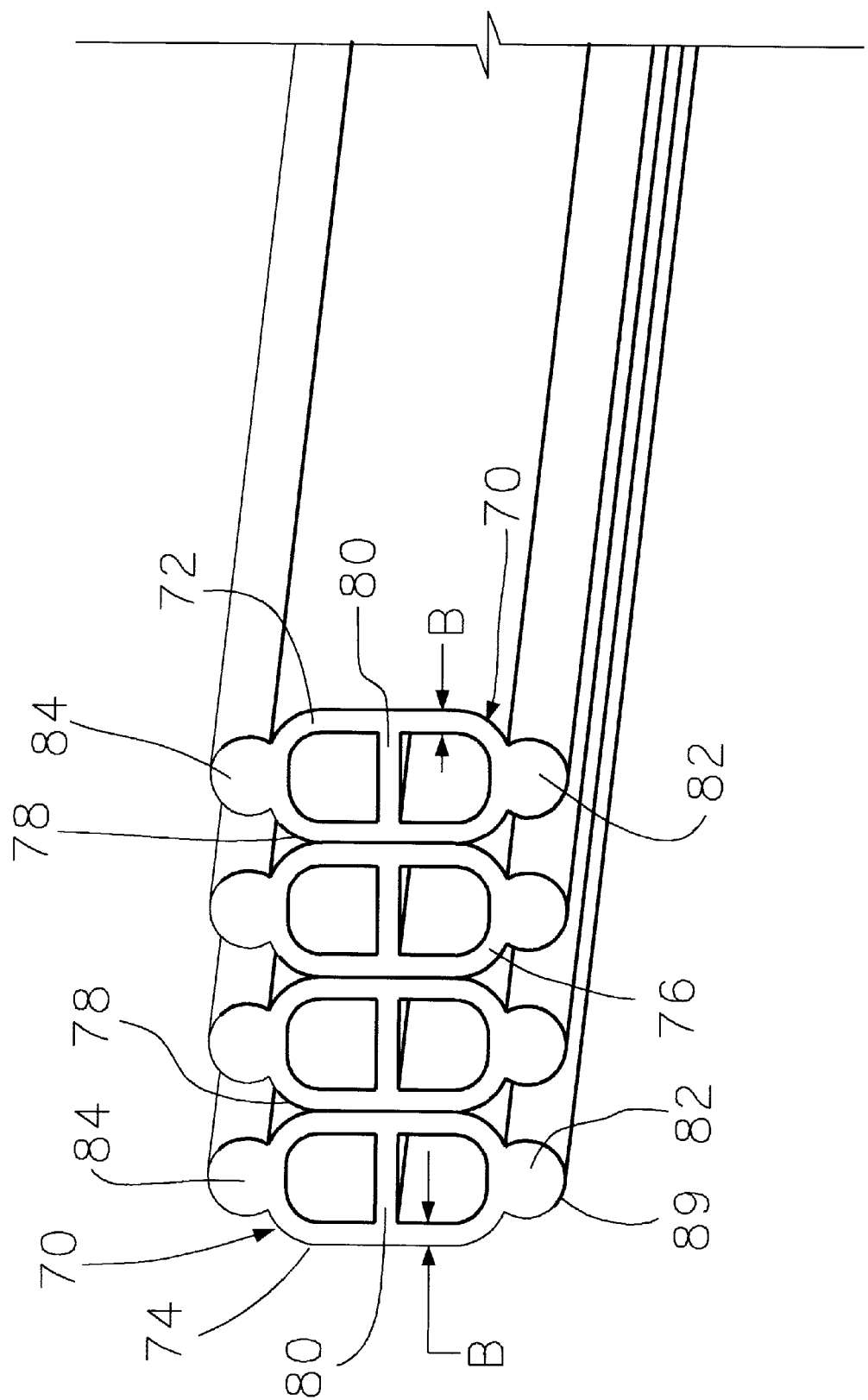

In FIG. 4 there is illustrated a coil 66 of the tube 50 in a coiled relationship with the cross-section of the tube 50 illustrated.

The outside dimension A from the outside of the first outrigger 60 and the outside of the second outrigger 62 may be about 1.10 inches.

The thickness of the bottom wall, see dimension B, and the top wall may be about 0.075 inches.

The diameter of the outrigger 60 and the outrigger 62 may be about 0.25 inches.

The thickness of the tube 50, see dimension C, can be about 0.40 inches.

The bottom side 52, top side 54, first curved end 56 and second curved end 58 have an inside surface and define the passageway 64.

The tube 50 may be made of an elastomer such as polyvinyl chloride, neoprene, EPDM, vinyl nitrile, polyethylene, polypropylene, or Krayton.

The configuration of the tube 50 with the outriggers 60 and 62 is such that the tube tends to lie flat and will not kink or fold back on itself. Due to this configuration it is relatively easy to lay the tube on the ground and stretch the tube for watering purposes. The flat bottom side 52 or the flat top side 54 make it relatively easy to stretch the tube onto the ground and for the tube to stay stretched in that position without kinking.

In FIGS. 5–8 there is illustrated a tube 70 having a bottom side 72 and a top side 74.

There is a first curved end 76 connecting 72 and 74.

There is a second curved end 78 connecting 72 and 74.

The sides 72 and 74 and the curved ends 76 and 78 define an outside surface and an inside surface.

There is a center web 80 or a divider 80 connecting the inside surface of the bottom side 72 and the top side 74.

On the outside surface of the first curved end 76 there is a first outrigger 82.

On the outside surface of the second curved end 78 there is a second outrigger 84.

The divider 80 divides the tube into a first channel 86 and a second channel 88.

The outside distance, see dimension A, from the outer surface of the first outrigger 82 to the outer surface of the second outrigger 84 may be about 1.10 inches.

The thickness, see dimension B, of the bottom side 72 or the top side 74 may be 0.075 inches.

The thickness of the tube 70, see dimension C, may be about 0.40 inches.

The diameter of the outrigger 82 or the outrigger 84 may be 0.25 inches.

The bottom side 72 and the top side 74 in the first curved end 76 and the second curved end 78 have an inside surface defining the channel. The divider 80 connects with the inside surface to divide the channel into two smaller channels.

The tube 70 is extruded and is of one piece unitary construction.

The tube 70 may be of an elastomer such as polyvinyl chloride, neoprene, EPDM, vinyl nitrile, polyethylene, polypropylene, or Krayton.

The construction and configuration of the tube 70 with the outriggers 82 and 84 and the flat bottom side 72 or the flat top side 74 make it possible to stretch the tube 70 onto the ground. The tube will not kink and fold back on itself. The tube lays flat on the ground. With the tube stretched on the ground it is easy to use the tube for watering purposes. Also, it is relatively easy to roll the tube 70 into a coil 89 for storage purposes and/or transport purposes.

Figure 9:
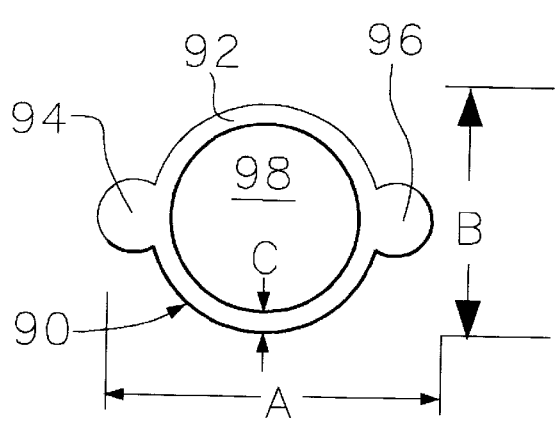
Figure 10:
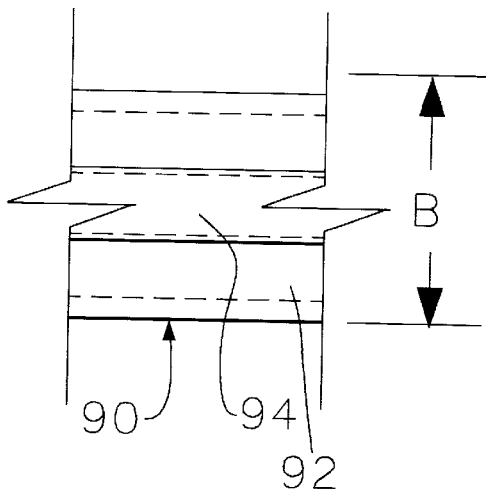
Figure 11:
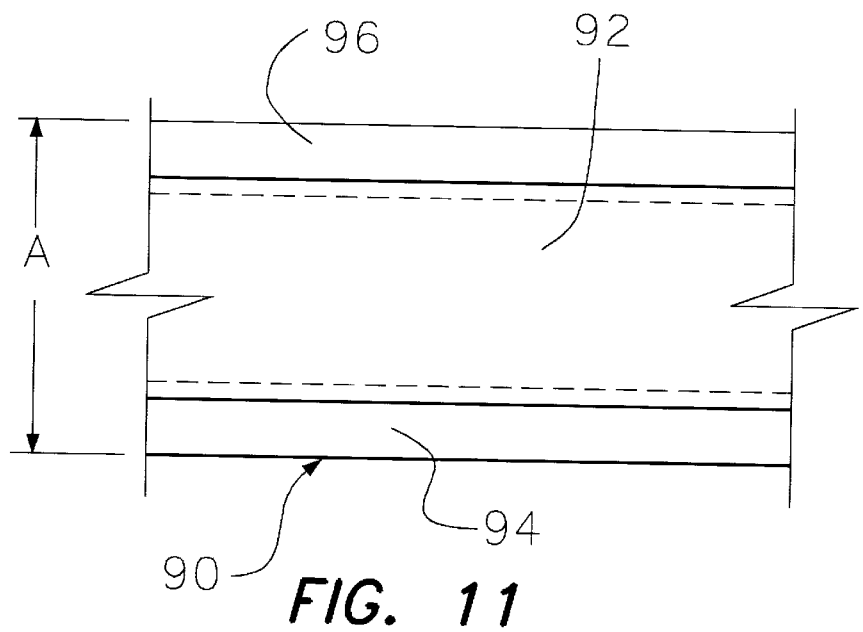

In FIGS. 9–12 there is illustrated a tube 90, see FIG. 9, in an end view of a generally circular configuration.

The tube 90 has a generally circular cross-sectional configuration 92. On the left there is a first outrigger 94 and on the right there is a second outrigger 96. The first outrigger 94 and the second outrigger 96 are approximately 180 degrees apart. The tube has an inside surface and comprises a central passageway 98.

Figure 12:
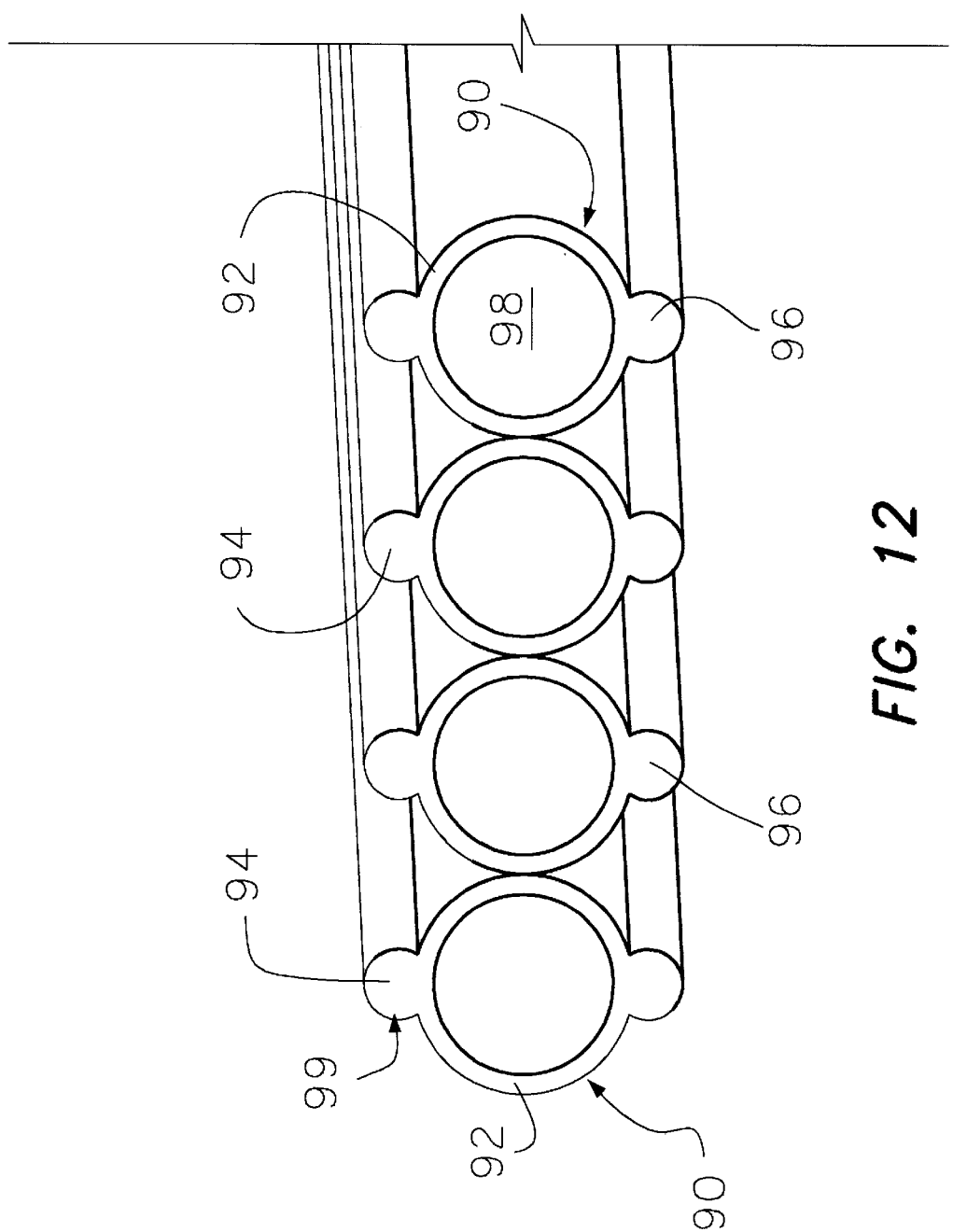
Figures 13, 14:
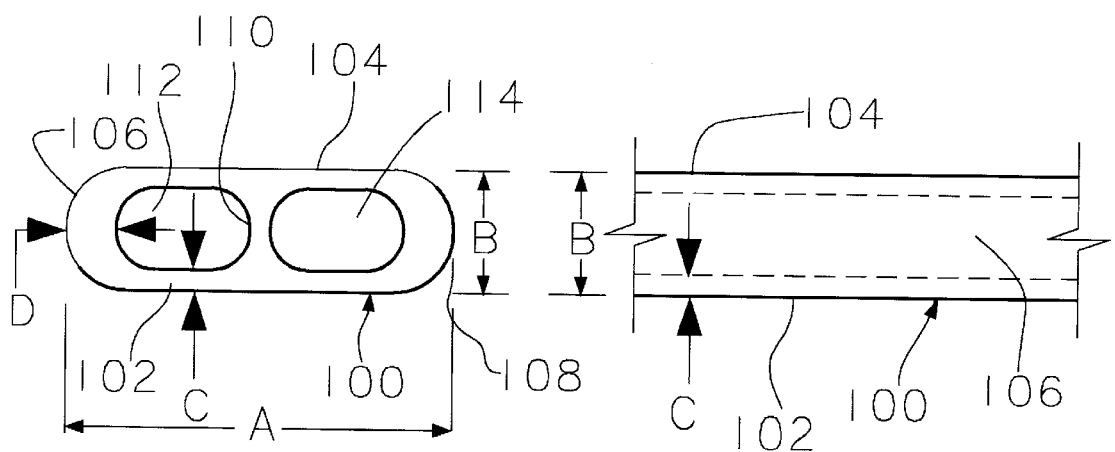
Figure 15:
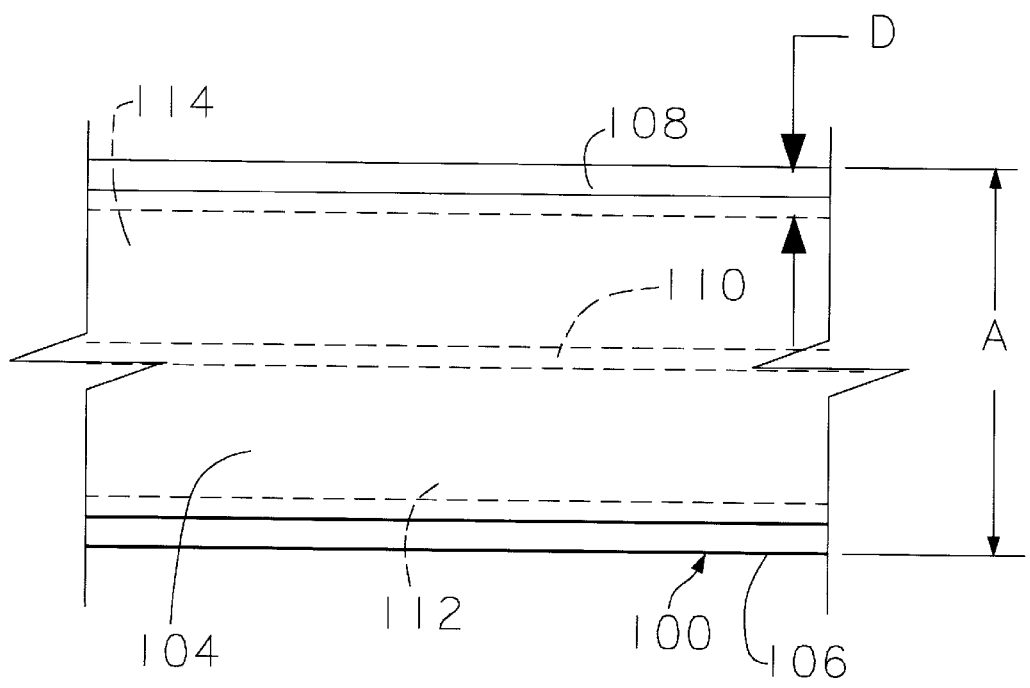
Figure 16:
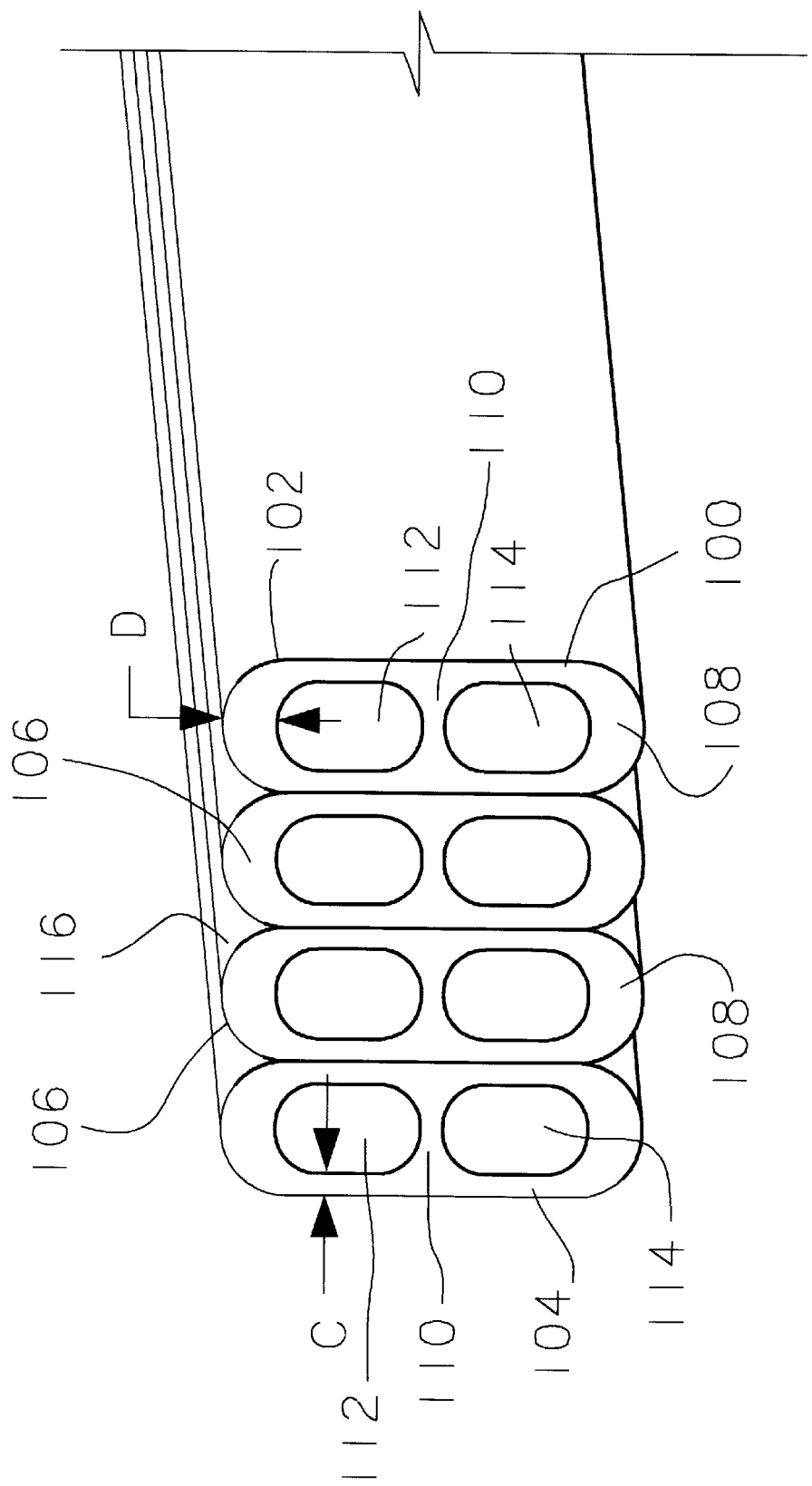
Figures 17, 18:
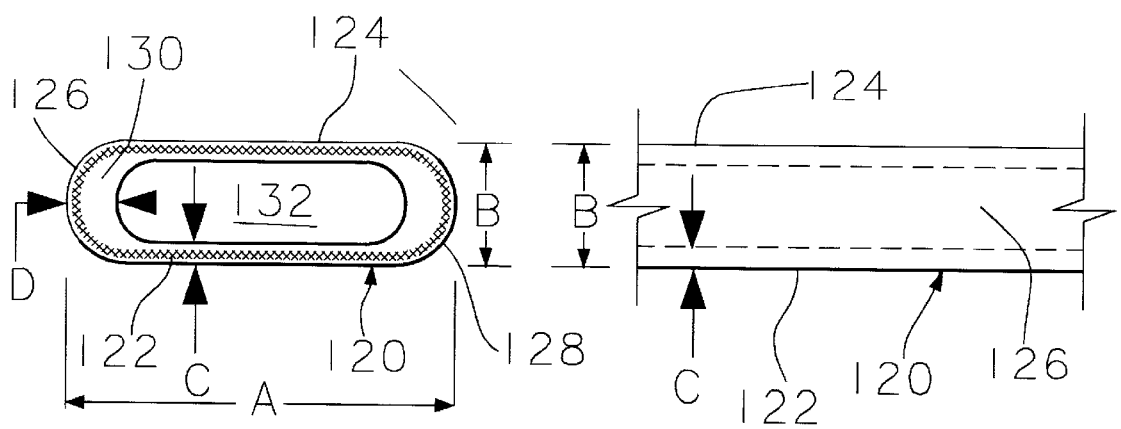
Figure 19:
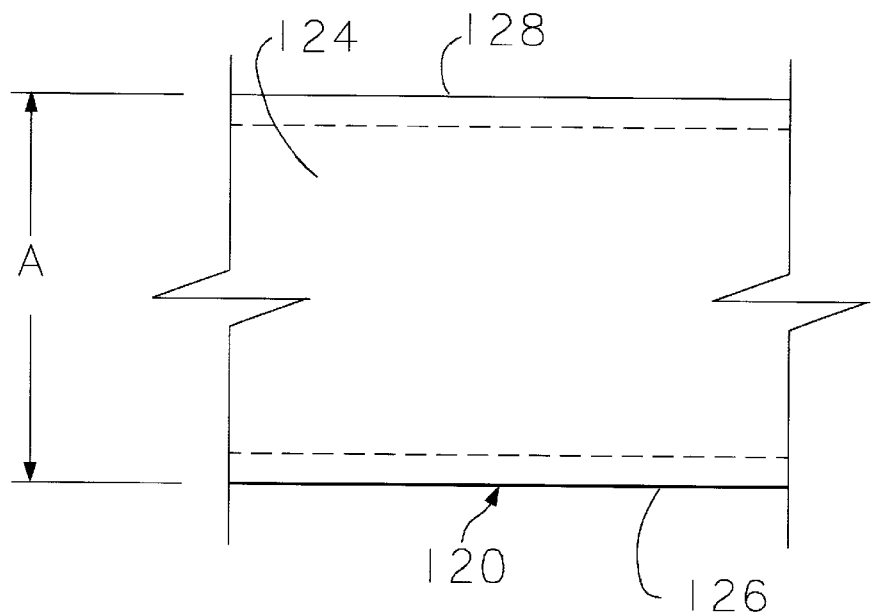
Figure 20:
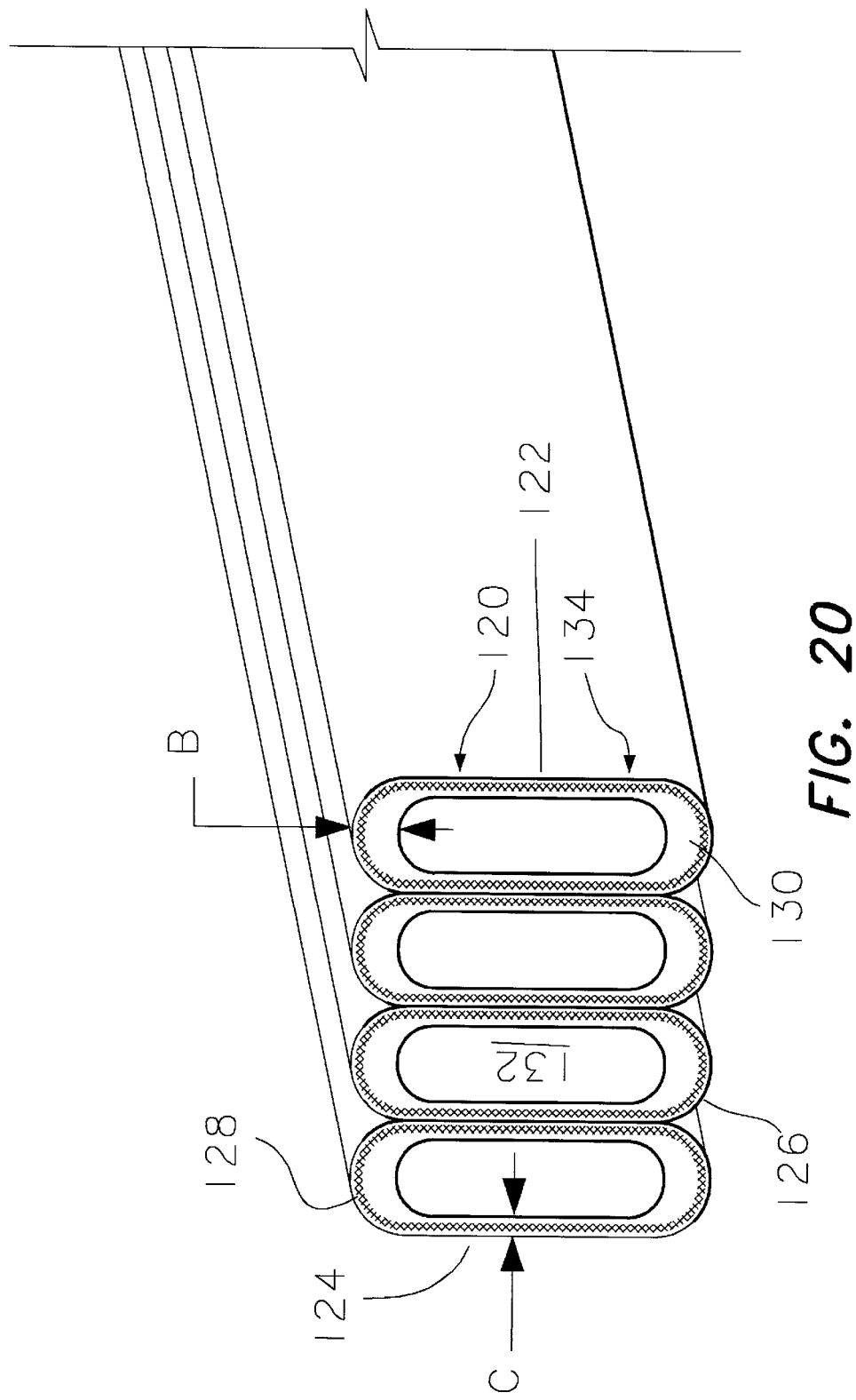
Figure 24:
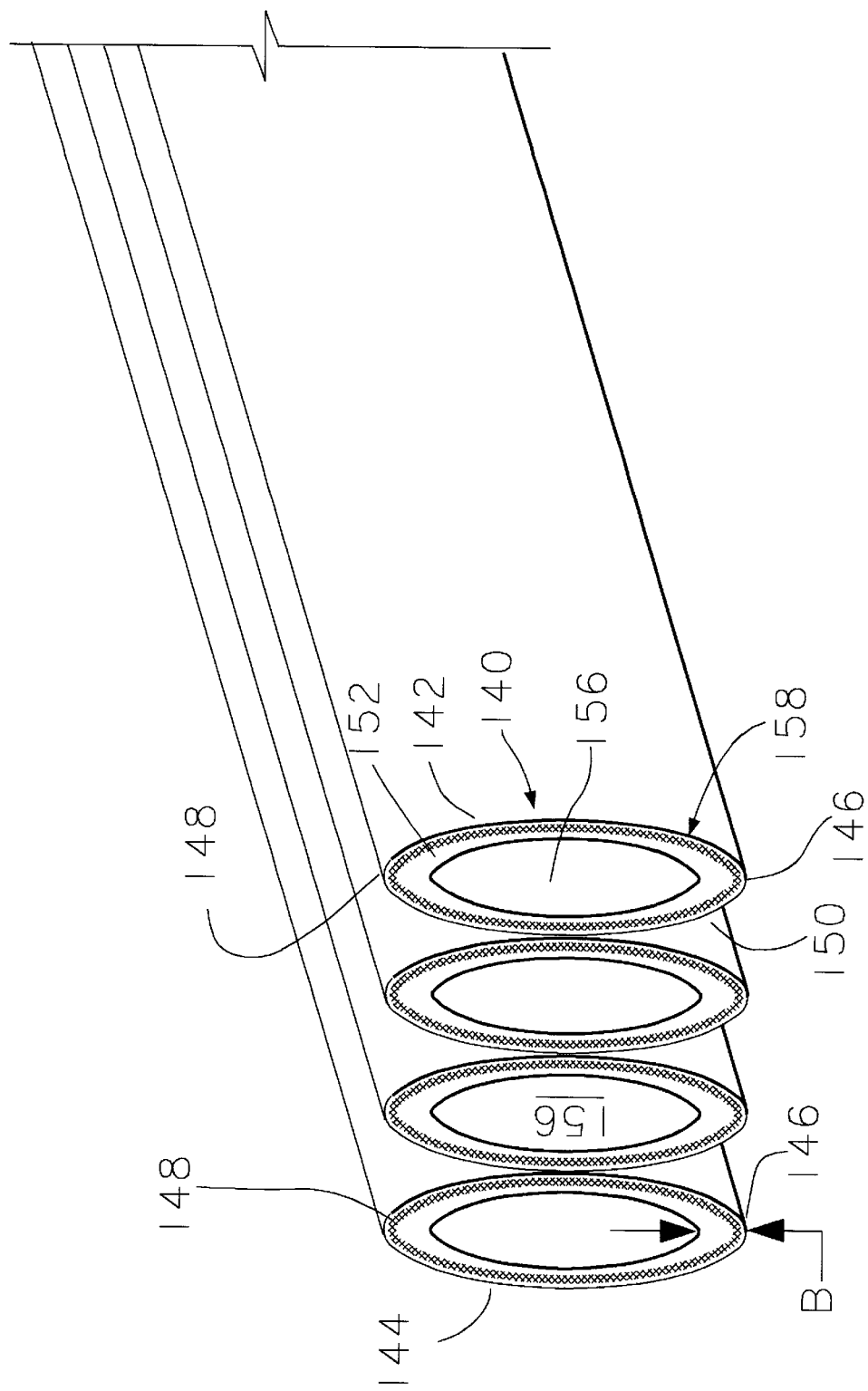

In FIG. 12 there is illustrated a coil 99 of the tube and the cross-section of the tube showing the circular cross-section.

The dimension A, the distance from the outside of the first outrigger 94 to the outside of the second outrigger 96, is about 1.10 inches.

The dimension B, the outside surface diameter of the tube without the outriggers, is about 0.6 inches.

The outriggers are about 0.25 inches in diameter.

The tube 90 is extruded from a suitable elastomer such as polyvinyl chloride, neoprene, EPDM, vinyl nitrile, polyethylene, polypropylene, or Krayton and may have a thickness of about 0.075 inches.

The tube 90 is of a one-piece unitary construction.

The tube 90 with the outriggers 94 and 96 make it relatively easy to position the tube on the ground such as a golf course having flat areas and rolling hilly areas. The outriggers 94 and 96 prevent the kinking of the tube or the tube folding back on itself. The outriggers 94 and 96 help position the tube so that the tube will lie on the ground. Further, the tube 90 with the outriggers 94 and 96 is readily coiled by wrapping the tube back on itself and coiling the tube for storage and for transportation.

In FIGS. 13–16 there is illustrated a tube 100 having a bottom side 102 and a top side 104.

A first curved end 106 connects the bottom side 102 and the top side 104.

A second curved end 108 connects the bottom side 102 and the top side 104.

The bottom side 102, top side 104, first curved end 106, and second curved end 108 have an interior surface defining a central passageway. A web or divider 110 connects with the interior surfaces of 102 and 104 to divide the central passageway into two channels, 112 and 114.

The outside dimension from the outside surface of the first curved end to the outside surface of the second curved end is dimension A, about 1 inch.

The thickness, dimension B, of the tube 100 or the distance from the outside surface of the bottom side 102 to the top side 104 is about 0.4 inches.

The wall thickness, dimension C, of the bottom side 72 and the top side is about 0.075 inches.

The wall thickness, dimension D, of the first curved end 106 and the second curved end 108 is about 0.20 inches.

The tube 100 is an extruded elastomer of a one-piece unitary construction and may be polyvinyl chloride, neoprene, EPDM, vinyl nitrile, polyethylene, polypropylene, or Krayton.

The wall thickness of the first curved end 76 and the wall thickness of the second curved end 78 add rigidity to the tube 100 and lessen the possibility of the tube 100 having a kink or folding back on itself. Also, the configuration of the tube 100 is such that it is relatively easy to roll the tube 100 into a coil 116 for storage purposes. Further, the configuration of the tube 100 is such that it is easy to lay the tube on the ground for a considerable distance for watering purposes such as watering a golf course.

The tube 120 of FIGS. 17–20 is, in a cross-sectional view, of a generally rectangular configuration. The tube 120 has a bottom side 122 and a top side 124.

There is a first curved end 126 connecting with the bottom side 122 and the top side 124.

There is a second curved end 128 connecting with the bottom side 122 and the top side 124.

The bottom side 122, the top side 124, the first curved end 126, and the second curved end 128 have an inside surface defining a central passageway 132.

The tube 120 has an outside surface.

The dimension A is the distance from the outside surface of the first end 126 to the outside surface of the second end 128 and is approximately 1.10 inches.

The dimension B is the distance from the outside surface of the bottom side 122 and the outside surface of the top side 124 and is approximately 0.40 inches.

The thickness, see dimension C, of the bottom side 122 and the top side 124, from the inside surface of the central passageway 132 to the outside surface of the sides 122 and 124 is about 0.075 inches.

The thickness, see dimension D, of the curved ends 126 and 128 is the distance from the inside surface of the central passageway 132 to the outside surface of the tube is approximately 0.20 inches. The walls of the ends 126 and 128 are thicker than the walls of 122 and 124 so as to give rigidity to the tube 120.

Between the outside surface of the tube 120 and the inside surface of the central passageway 132 there is a woven braid for reinforcing and rigidity purposes. The woven braid 130 can be of nylon mesh or polyester. A material of construction of the tube 120 can be an elastomer such as polyvinyl chloride, neoprene, EPDM, vinyl nitrile, polyethylene, polypropylene, or Krayton.

The relatively thick curved end 126 and 128 add rigidity to the tube 120 and prevent the kinking of the tube, viz., the tube 120 folding back on itself. As a result, the tube 120 will lie flat on the ground as used in watering a golf course and also will be easy to make into a coil as shown by the coil 134 in FIG. 20.

In FIGS. 21 through 24 there is illustrated a tube 140 which in a lateral end view is seen to be of an elliptical configuration.

The tube 140 has a lower curved side 142 and an upper curved side 144.

A first curved end 146 connects with 142 and 144.

A second curved end 148 connects with 142 and 144.

The lower curved side 142 and the upper curved side 144, see dimension A, are of a thickness of approximately 0.075 inches.

The first curved end 146 and the second curved end 148 have a thickness of approximately 0.20 inches, see dimension B.

The length of the major axis, C, of the ellipse is approximately 1.10 inches from the outer surface of side 146 to the side 148.

The length of the minor axis, D, is approximately 0.40 inches from the outer surface of 142 to the outer surface of 144.

The tube 140 is composed of sides 142 and 144 and curved ends 146 and 148 and has an outer surface and also has an inner surface which defines an elliptical central passageway 156.

In the body of the tube 140 and between the outer surface and the inner surface there is a woven reinforcing braid 150 which may be nylon mesh or polyester.

The relatively thick ends 146 and 148 in conjunction with the relatively thin sides 142 and 144 make it possible for the tube 140 to lie substantially flat on the ground or on the grass and to not kink or fold back on itself. Also, this makes it possible for the tube to be coiled as shown in the coil 158 for storage and transport purposes.

The material of construction of the tube 140 can be an elastomer such as polyvinyl chloride, neoprene, EPDM, vinyl nitrile, polyethylene, polypropylene, or Krayton.

FIGS. 25 through 28 are directed to a clamp 170 for clamping to the tube and for making it possible to have a liquid flow to and through the tube and also for a liquid to flow away from the tube.

There is illustrated the clamp 170 having members 172. There are two members 172 to form the clamp.

The member 172 has an outer surface 174 and curved ends 196.

In a plan view the member 172 is of a generally rectangular configuration having a first long side 178 and a spaced apart second long side 180.

The member 172 has a first short side 182 and a spaced apart second short side 184.

Figure 25:
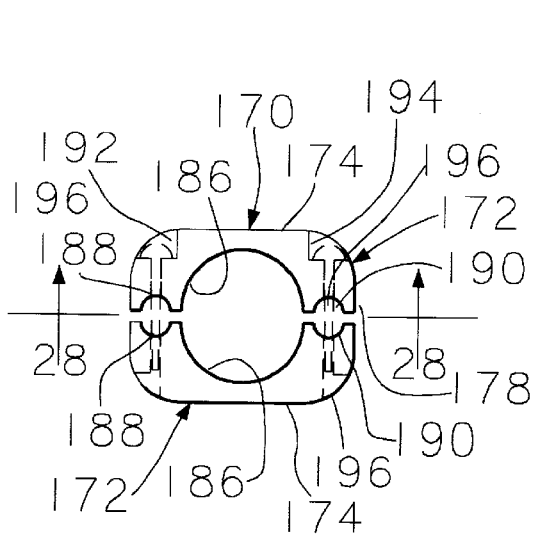
Figure 26:
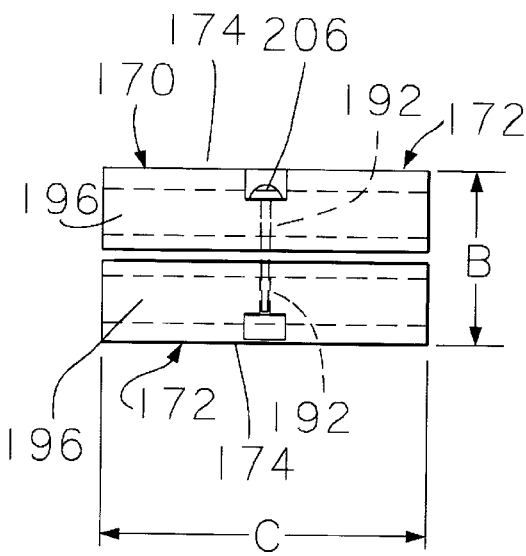
Figure 27:
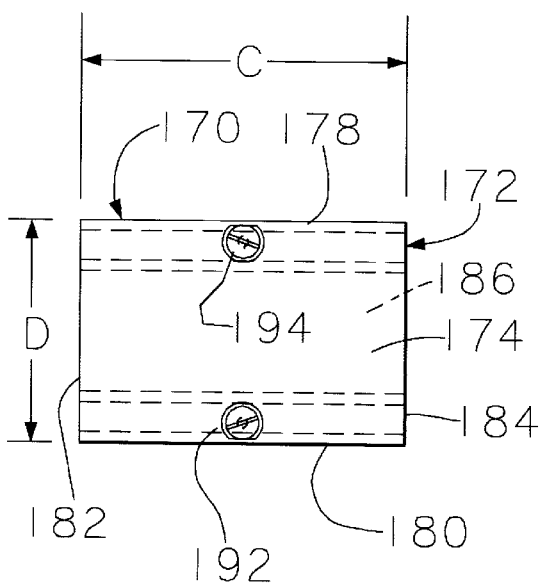
Figure 28:
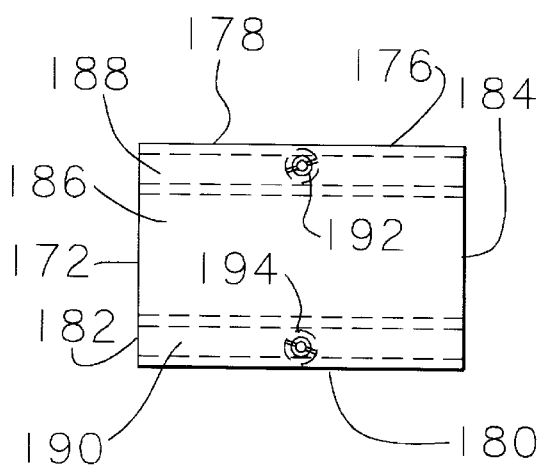
FIG. 28 is a plan view looking at the inside surface of the member of the clamp.

In FIG. 28, taken on line 28-28 in FIG. 25 it is seen that there is a main central longitudinal groove 186, a first outrigger groove 188 and a second outrigger groove 190.

There is a passageway 192 in the first outrigger groove 182. There is a passageway 194 in the second outrigger groove 190. These passageways are for receiving a screw for holding together the two members 172. The two members 172 with their interfaces next to each other appear as illustrated in FIG. 25, an end view. The outrigger grooves are aligned to form a large first outrigger groove and a large second outrigger groove. The main central longitudinal grooves 186 are aligned to form a large main central longitudinal groove.

The thickness of a member 172, see dimension A, from the inside surface to the outside surface 174 is approximately 0.5 inches.

With two members 172 aligned and in position the thickness of the clamp 170, see dimension B, is about one inch.

The length of the member 172 or the length of a long side 178 or 180, dimension C, is about two inches.

The width of a member 172, see dimension D, the short side 182 or 184, is about one and three-eighths inches.

The material of construction of the member 172 is a suitable plastic like high-density polyethylene.

Figure 29:
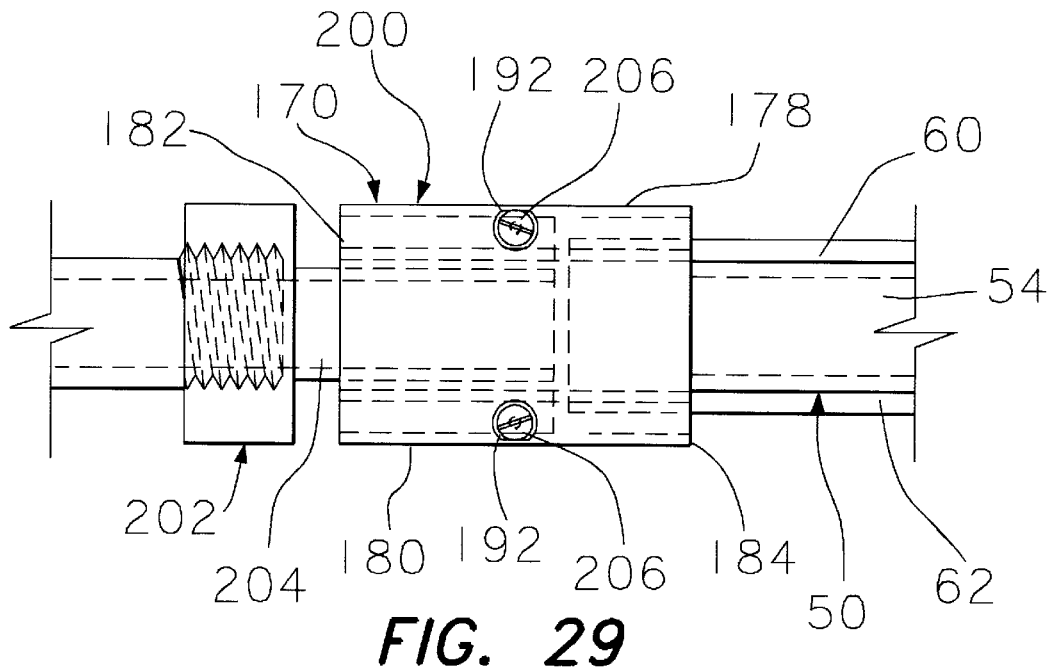
FIG. 29 is a top plan view of a combination of the clamp, the inlet adaptor for introducing liquid to the clamp and the tube for receiving the liquid and transferring the liquid away from the clamp.

In FIG. 29 there is illustrated a combination 200 of the clamp 170, an inlet adaptor 202, an outlet nozzle 204 on the inlet adaptor 202, and an outlet tube 50 in the clamp 170 cooperating with the inlet adaptor 202 and the outlet nozzle 204. There are self-tapping screws 206 in the passageways 192 for positioning and holding together two members 172 to form the clamp 170. The inlet adaptor 202 can be the commercially available adaptor as used on garden hoses.

The clamp 170, the inlet adaptor 202, and the outlet nozzle 204, and the tube 50 are referred to as a combination 200.

The inlet adaptor 202 is internally threaded for mating with a water nozzle.

The body of the tube 50 is in the groove defined by the two large main central longitudinal grooves of the clamps 172. The outriggers 60 and 62 of the tube 50 are positioned in the large first and second outrigger grooves 188 and 190 of the clamp 170.

The self-tapping screws 206 hold together the two members 172 to definitely position the inlet adaptor 202 and the outlet tube 50.

Figure 30:
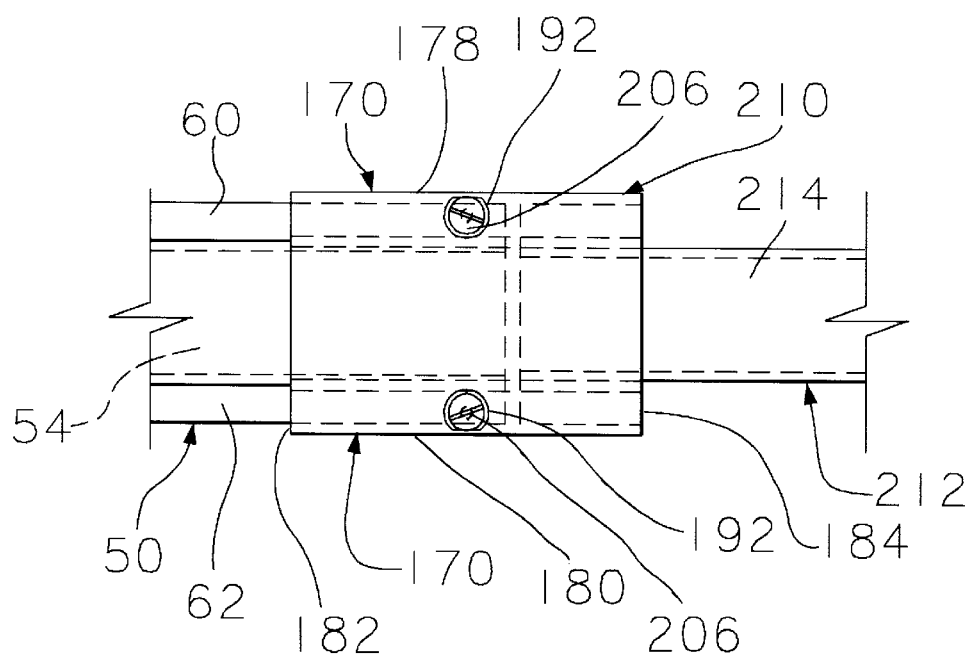
FIG. 30 is a top plan view of the combination of the clamp, the inlet tube to the clamp for transferring liquid to the clamp and the outlet adaptors for receiving liquid in the clamp and transferring the liquid away from the clamp and with said outriggers in said outrigger grooves.

FIG. 30 is a top plan view of the combination 210. The combination 210 comprises the clamp 170 and the inlet tube 50 to the clamp 170.

Also, the combination 210 comprises the clamp 170 and the outlet attachment 212 for connection to an applicator such as a nozzle. It is seen that on 212 that there are external threads 214.

The combination 210 comprises the inlet tube 50 for conveying water through the clamp 170 to the externally threaded outlet attachment 212.

The body of the tube 50 is in the groove defined by the two large main central grooves of the clamps 172. The outriggers 60 and 62 of the tube 50 are positioned in the large first and second outrigger grooves 188 and 190 of the clamp 170.

The self-tapping screws hold together the two members 172 to definitely position the inlet tube 50 and the outlet attachment 212.

Figure 31:
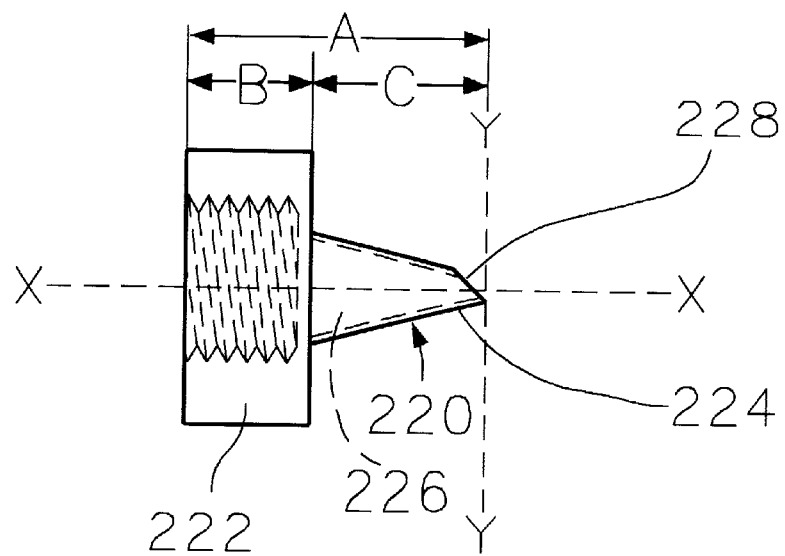
Figure 32:
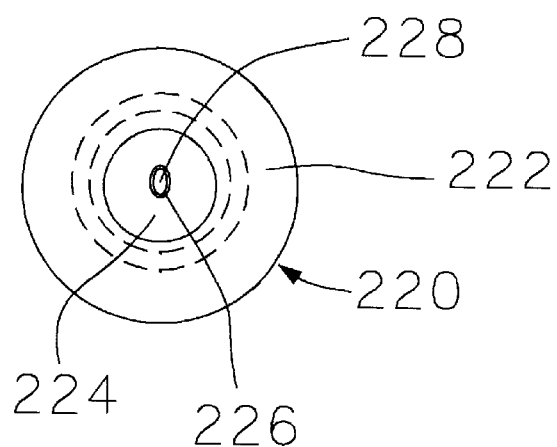
Figure 33:
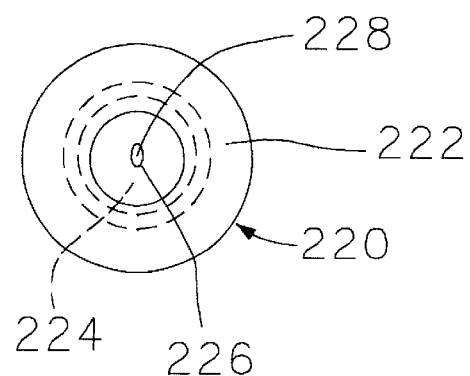

FIGS. 31–33 are directed to an outlet 220 for directing water or liquid.

The outlet 220 has an adaptor 222 for attaching to the outlet attachment 212, see FIG. 30. The adaptor 222 is a tapped adaptor.

The outlet 220 comprises an outlet nozzle 224 which is of a generally conical configuration.

In the outlet nozzle 224 there is a passageway 226 for the flow of a liquid or water.

The outer end of the conical outlet nozzle 224 is at an angle or edge 228.

With respect to the longitudinal axis x-x of the outlet 220 the end edge 228 is at a 45-degree angle to a vertical line y-y to the longitudinal axis x-x.

The outlet 220 has a length of about 1.5 inches, see dimension A.

The length of the adaptor 222 is about ⅝ inches, see dimension B.

The length of the nozzle 224 is about ⅞ inches, see dimension C.

The diameter of the adaptor 222 is about one and three-eighths inches, see dimension D.

The diameter of the inlet to the nozzle 224, see dimension E, is about 9/16 inches.

The outlet of the nozzle 224 has a dimension of approximately 7/16 inches. The outlet is in the configuration of an ellipse.

The nozzle 224 can be molded out of a semi-flexible material such as flexible polyvinyl chloride, and at an angle to the longitudinal axis at the end of the conical outlet. The liquid or water can be easily dispersed in the form of a stream for distant watering and for cleaning surfaces, to a gentle spray for watering plants and wetting leaves because of the semi-flexible material of 224. A person can use a thumb or finger for adjusting the nozzle 224.

With reference to FIGS. 35–38 it is seen that there is a tube 240 having a bottom side 242 and a top side 244.

There is a first curved end 246 connecting 242 and 244. There is a second curved end 248 connecting 242 and 244.

On the outer surface of the first curved end 246 there is an outrigger 250. On the outer surface of the second curved end 248 there is a second outrigger 252.

The top side, bottom side, first curved end, and the second curved end have an inside surface to define a central passageway 254.

In the outrigger 250 there is a passageway 256. In the outrigger 252 there is a passageway 258.

In FIG. 38 there is illustrated a coil 260 of the tube 240 in a coil relationship with the cross-section of the tube 240 illustrated.

The outside dimension A from the outside of the first outrigger 250 to the outside of the second outrigger 252 may be about 1.10 inches. The thickness of the bottom wall, see dimension B, and the top wall may be about 0.075 inches.

The diameter of the outrigger 250 and the outrigger 252 may be about 0.025 inches. The thickness of the tube 240, see dimension C, can be 0.40 inches.

The passageway 256 in the outrigger 250 may have a diameter of about 0.01 inches.

The diameter of the passageway 258 in the outrigger 252 may have an inside diameter of about 0.01 inches.

The bottom side 242 and the top side 244, first curved end 246 to the second curved end 248 have an inside surface to define the passageway 254.

The tube 240 may be made of an elastomer such as polyvinyl chloride, neoprene, EPDM, vinyl nitrile, polyethylene, polypropylene, or Krayton.

The configuration of the tube 240 with the outriggers 250 and 252 is such that the tubes tends to lie and will not kink or fold back on itself. Due to this configuration it is relatively easy to lay the tube on the ground and stretch the tube for watering purposes. The flat bottom side 242 and the flat top side 244 make it relatively easy to stretch the tube to the ground and for the tube to stay stretched in that position without kinking.

The outriggers 250 and 252 on the tube 240 are larger than the outriggers 60 and 62 on tube 50. The increase in the outrigger diameter helps to maintain the flow rate of liquid through the tube 240 when the tube 240 is on a reel. Also, the larger outriggers 250 and 252 increase the flexibility of the tube 240. A further advantage is that with the passageways 256 and 258 on the outriggers there is a decrease in the quantity of material used in making the tube 240 as compared with making the tube 50.

In FIGS. 40, 41 and 42 there is illustrated the tube 240 with a stiffening rods 260 in passageway 256 and/or passageway 258 in the outriggers 250 and 252. The stiffening rod 260 may be of wood, a metal such as steel, aluminum, copper or brass, or a plastic such as high-density polyethylene. The stiffening rod adds stiffness to the outer end of the tube 240. In fact, the stiffening rods 260 make the outer end of the tube 240 a nozzle. A person can squeeze on the inner part of the bottom surface 242 and the top surface 244 to restrict the flow of fluid through the passageway 260.

It is to be understood that the dimensions and sizes of the tube, the members of the clamp, and the clamp can vary. The dimensions of the tube, the members of the clamp, and the clamp can vary to meet the requirements of the job. The foregoing dimensions are the dimensions of the prototype to determine the applicability of the tube and the accessories for the distribution of a liquid such as water.

The conical outlet nozzle 224 can be an injected molded plastic fitting which attaches to the adaptor 222 to enable a variable output of water from a stream to a spray by a simple finger pressure over the conical outlet nozzle 224. By molding the nozzle 224 of a semi-flexible material such as flexible polyvinyl chloride and by an angle feature at the end of the conical outlet, the liquid or water can be easily dispersed in the form of a stream for distant watering and for cleaning surfaces to a gentle for watering plants and wetting leaves.

In FIG. 34 there is illustrated a combination 230 comprising the clamp 170. On the left of the clamp 170 there is an inlet tube 50 for conveying liquid or water to the clamp 170.

On the right of the clamp 170 there is an outlet attachment 212 for receiving the liquid or water.

Then, on the outlet attachment 212 there is the outlet nozzle 220 for directing the flow of liquid or water.

The body of the tube 50 is in the groove defined by the two large main central longitudinal grooves of the clamps 172. The outriggers 60 and 62 of the tube 50 are positioned in the large first and second outrigger grooves 188 and 190 of the clamp 170.

The self-tapping screws 206 hold together the two members 172 to definitely position the inlet tube 50 and the outlet adaptor 222.

A tube for conveying a liquid and comprising said tube in an end view comprising a wall encircling a passageway and defining a passageway; and in a clockwise direction at approximately 0 degrees and said wall is thicker than the wall between 0 degrees and 180 degrees and between 180 degrees and 0 degrees to give rigidity to said tube and to lessen the possibility of a kink in said tube.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; and said tube being of one piece unitary construction.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube being of one piece unitary construction; said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; and said first outrigger and said second outrigger lessen the possibility of a kink in the tube.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; and said tube being of one piece unitary construction.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being of one piece unitary construction; said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said bottom side having a first inner surface; said top side having a second inner surface; and a divider connecting with said first inner surface and with said second inner surface to define a first channel and a second channel in said tube.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said bottom side having a first inner surface; said top side having a second inner surface; a divider connecting with said first inner surface and with said second inner surface to define a first channel and a second channel in said tube; and said tube being of one piece unitary construction.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said bottom side having a first inner surface; said top side having a second inner surface; a divider connecting with said first inner surface and with said second inner surface to define a first channel and a second channel in said tube; said tube being of one piece unitary construction; said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally circular configuration; said tube having an exterior surface; on said exterior surface a first outrigger; and on said exterior surface a second outrigger to give rigidity to said tube and to lessen the possibility of a kink in said tube.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally circular configuration; said tube having an exterior surface; on said exterior surface a first outrigger; on said exterior surface a second outrigger to give rigidity to said tube and to lessen the possibility of a kink in said tube; and said first outrigger and said second outrigger being approximately 180 degrees apart.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally circular configuration; said tube having an exterior surface; on said exterior surface a first outrigger; on said exterior surface a second outrigger to give rigidity to said tube and to lessen the possibility of a kink in said tube; and said first outrigger and said second outrigger being less than 180 degrees apart.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally circular configuration; said tube having an exterior surface; on said exterior surface a first outrigger; on said exterior surface a second outrigger to give rigidity to said tube and to lessen the possibility of a kink in said tube; and said tube being of one piece unitary construction.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally circular configuration; said tube having an exterior surface; on said exterior surface a first outrigger; on said exterior surface a second outrigger to give rigidity to said tube and to lessen the possibility of a kink in said tube; said tube being of one piece unitary construction; and said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; a second curved end joining said bottom side and said top side and having an exterior surface; said first curved end being thicker than said bottom side and thicker than said top side to give rigidity to said tube and to lessen the possibility of a kink in said tube; said second curved end being thicker than said bottom side and thicker than said top side to give rigidity to said tube and to lessen the possibility of a kink in said tube; said bottom side having a first inner surface; said top side having a second inner surface; and a divider connecting with said first inner surface and with said second inner surface to define a first channel and a second channel in said tube.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; a second curved end joining said bottom side and said top side and having an exterior surface; said first curved end being thicker than said bottom side and thicker than said top side to give rigidity to said tube and to lessen the possibility of a kink in said tube; said second curved end being thicker than said bottom side and thicker than said top side to give rigidity to said tube and to lessen the possibility of a kink in said tube; said bottom side having a first inner surface; said top side having a second inner surface; a divider connecting with said first inner surface and with said second inner surface to define a first channel and a second channel in said tube; and said tube being of one piece unitary construction.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; a second curved end joining said bottom side and said top side and having an exterior surface; said first curved end being thicker than said bottom side and thicker than said top side to give rigidity to said tube and to lessen the possibility of a kink in said tube; said second curved end being thicker than said bottom side and thicker than said top side to give rigidity to said tube and to lessen the possibility of a kink in said tube; said bottom side having a first inner surface; said top side having a second inner surface; a divider connecting with said first inner surface and with said second inner surface to define a first channel and a second channel in said tube; said tube being of one piece unitary construction; and said tube being an elastomer plastic having characteristics

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube having an exterior surface; said tube having an interior surface around said passageway; and a reinforcing braid between said exterior surface and said interior surface.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; said tube having an exterior surface; said tube having an interior surface around said passageway; a reinforcing braid between said exterior surface and said interior surface; and said tube being an elastomer plastic having characteristics

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; in cross-section the exterior surface being of an elliptical configuration; said tube surrounding said passageway defining an interior surface; and the distance between the interior surface and the exterior surface on the major axis being greater than the distance between the interior surface and exterior surface on the minor axis to give rigidity to said tube and to lessen the possibility of a kink in said tube.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; in cross-section the exterior surface being of an elliptical configuration; said tube surrounding said passageway defining an interior surface; the distance between the interior surface and the exterior surface on the major axis being greater than the distance between the interior surface and exterior surface on the minor axis to give rigidity to said tube and to lessen the possibility of a kink in said tube; and said tube being a one piece unitary construction.

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; in cross-section the exterior surface being of an elliptical configuration; said tube surrounding said passageway defining an interior surface; the distance between the interior surface and the exterior surface on the major axis being greater than the distance between the interior surface and exterior surface on the minor axis to give rigidity to said tube and to lessen the possibility of a kink in said tube; said tube being a one piece unitary construction; and said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid and comprising said tube in an end view comprising a wall encircling a passageway and defining a passageway; in a clockwise direction at approximately 0 degrees and 180 said wall is thicker than the wall between 0 degrees and 180 degrees and between 180 degrees and 0 degrees to give rigidity to said tube and to lessen the possibility of a kink in said tube; in cross-section the exterior surface being of an elliptical configuration; said tube surrounding said passageway defining an interior surface; the distance between the interior surface and the exterior surface on the major axis being greater than the distance between the interior surface and exterior surface on the minor axis to give rigidity to said tube and to lessen the possibility of a kink in said tube; said tube being a one piece unitary construction; said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175; | and a reinforcing braid between said exterior surface and said interior surface.

A process for making a tube for conveying a liquid, said process comprising extruding said tube to have in an end view a wall encircling a passageway and defining a passageway; and in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; and extruding said tube to be of a one piece unitary construction.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; and said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger being continuous; and forming said first outrigger and said second outrigger to lessen the possibility of a kink in the tube.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger being continuous; forming said first outrigger and said second outrigger to lessen the possibility of a kink in the tube; and extruding said tube to be of one piece unitary construction.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger being continuous; forming said first outrigger and said second outrigger to lessen the possibility of a kink in the tube; and selecting said elastomer to have the following characteristics:

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube, in an end view, to be of a generally rectangular configuration having a bottom side and a spaced apart top side; forming a first curved end to join said bottom side and said top side; forming said first curved end to have an exterior surface; forming a second curved end to join said bottom side and said top side and having an exterior surface; forming on the outer surface of said first curved end a first outrigger; forming on the outer surface of said second curved end a second outrigger; forming said bottom side, said first curved end, said top side, said second curved end, said first outrigger, and said second outrigger to be continuous and unitary; said first outrigger and said second outrigger lessen the possibility of a kink in the tube; forming said bottom side to have a first inner surface; forming said top side to have second inner surface; and connecting a divider with said first inner surface and with said second inner surface to define a first channel and a second channel in said tube.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube, in an end view, to be of a generally rectangular configuration having a bottom side and a spaced apart top side; forming a first curved end to join said bottom side and said top side; forming said first curved end to have an exterior surface; forming a second curved end to join said bottom side and said top side and having an exterior surface; forming on the outer surface of said first curved end a first outrigger; forming on the outer surface of said second curved end a second outrigger; forming said bottom side, said first curved end, said top side, said second curved end, said first outrigger, and said second outrigger to be continuous and unitary; said first outrigger and said second outrigger lessen the possibility of a kink in the tube; forming said bottom side to have a first inner surface; forming said top side to have second inner surface; connecting a divider with said first inner surface and with said second inner surface to define a first channel and a second channel in said tube; and forming said tube to be one piece unitary construction.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube, in an end view, to be of a generally rectangular configuration having a bottom side and a spaced apart top side; forming a first curved end to join said bottom side and said top side; forming said first curved end to have an exterior surface; forming a second curved end to join said bottom side and said top side and having an exterior surface; forming on the outer surface of said first curved end a first outrigger; forming on the outer surface of said second curved end a second outrigger; forming said bottom side, said first curved end, said top side, said second curved end, said first outrigger, and said second outrigger to be continuous and unitary; said first outrigger and said second outrigger lessen the possibility of a kink in the tube; forming said bottom side to have a first inner surface; forming said top side to have second inner surface; connecting a divider with said first inner surface and with said second inner surface to define a first channel and a second channel in said tube; forming said tube to be one piece unitary construction; and selecting said elastomer to have the following characteristics:

|  | low | high |
|---|---|---|
| specific gravity | 1.28 | 1.38 |
| shore "D" hardness | 74 | 86 |

-continued

|  | low | high |
|---|---|---|
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be, in an end view, of a generally circular configuration; forming said tube to have an exterior surface; forming a first outrigger on said exterior surface; and forming a second outrigger on said exterior surface to give rigidity to said tube and to lessen the possibility of a kink in said tube.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be, in an end view, of a generally circular configuration; forming said tube to have an exterior surface; forming a first outrigger on said exterior surface; forming a second outrigger on said exterior surface to give rigidity to said tube and to lessen the possibility of a kink in said tube; and forming said first outrigger and said second outrigger to be approximately 180 degrees apart.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be, in an end view, of a generally circular configuration; forming said tube to have an exterior surface; forming a first outrigger on said exterior surface; forming a second outrigger on said exterior surface to give rigidity to said tube and to lessen the possibility of a kink in said tube; and forming said first outrigger and said second outrigger to be less than 180 degrees apart.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be, in an end view, of a generally circular configuration; forming said tube to have an exterior surface; forming a first outrigger on said exterior surface; forming a second outrigger on said exterior surface to give rigidity to said tube and to lessen the possibility of a kink in said tube; and extruding said tube to be one piece unitary construction.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be, in an end view, of a generally circular configuration; forming said tube to have an exterior surface; forming a first outrigger on said exterior surface; forming a second outrigger on said exterior surface to give rigidity to said tube and to lessen the possibility of a kink in said tube; and selecting said elastomer to have the following characteristics:

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175 |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming said first curved end to be thicker than said bottom side and to be thicker than said top side to give rigidity to said tube and to lessen the possibility of a kink in said tube; forming said second curved end to be thicker than said bottom side and to be thicker than said top side to give rigidity to said tube and to lessen the possibility of a kink in said tube; forming said bottom side to have a first inner surface; forming said top side to have a second inner surface; and connecting a divider with said first inner surface and with said second inner surface to define a first channel and a second channel in said tube.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming said first curved end to be thicker than said bottom side and to be thicker than said top side to give rigidity to said tube and to lessen the possibility of a kink in said tube; forming said second curved end to be thicker than said bottom side and to be thicker than said top side to give rigidity to said tube and to lessen the possibility of a kink in said tube; forming said bottom side to have a first inner surface; forming said top side to have a second inner surface; connecting a divider with said first inner surface and with said second inner surface to define a first channel and a second channel in said tube; and forming said tube to be one piece unitary construction.

A process for making a tube for conveying a liquid, said process comprising extruding said tube to have in an end view a wall encircling a passageway and defining a passageway; and in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming said first curved end to be thicker than said bottom side and to be thicker than said top side to give rigidity to said tube and to lessen the possibility of a kink in said tube; forming said second curved end to be thicker than said bottom side and to be thicker than said top side to give rigidity to said tube and to lessen the possibility of a kink in said tube; forming said bottom side to have a first inner surface; forming said top side to have a second inner surface; connecting a divider with said first inner surface and with said second inner surface to define a first channel and a second channel in said tube; and selecting said elastomer to have the following characteristics:

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to have an exterior surface; forming said tube to have an interior surface around said passageway; and forming a reinforcing braid between said exterior surface and said interior surface.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to have an exterior surface; forming said tube to have an interior surface around said passageway; forming a reinforcing braid between said exterior surface and said interior surface; and selecting said elastomer to have the following characteristics:

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to have the exterior surface, in cross-section, to be of an elliptical configuration; forming said tube to have an interior surface around said passageway; and forming said tube to have the distance between the interior surface and the exterior surface on the major axis being greater than the distance between the interior surface and exterior surface on the minor axis to give rigidity to said tube and to lessen the possibility of a kink in said tube.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to have the exterior surface, in cross-section, to be of an elliptical configuration; forming said tube to have an interior surface around said passageway; forming said tube to have the distance between the interior surface and the exterior surface on the major axis being greater than the distance between the interior surface and exterior surface on the minor axis to give rigidity to said tube and to lessen the possibility of a kink in said tube; and forming said tube to be of one piece unitary construction.

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to have the exterior surface, in cross-section, to be of an elliptical configuration; forming said tube to have an interior surface around said passageway; forming said tube to have the distance between the interior surface and the exterior surface on the major axis being greater than the distance between the interior surface and exterior surface on the minor axis to give rigidity to said tube and to lessen the possibility of a kink in said tube; forming said tube to be of one piece unitary construction; and selecting said elastomer to have the following characteristics:

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to have the exterior surface, in cross-section, to be of an elliptical configuration; forming said tube to have an interior surface around said passageway; forming said tube to have the distance between the interior surface and the exterior surface on the major axis being greater than the distance between the interior surface and exterior surface on the minor axis to give rigidity to said tube and to lessen the possibility of a kink in said tube; forming said tube to be of one piece unitary construction; and selecting said elastomer to have the following characteristics:

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for making a tube for conveying a liquid, said process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to have the exterior surface, in cross-section, to be of an elliptical configuration; forming said tube to have an interior surface around said passageway; forming said tube to have the distance between the interior surface and the exterior surface on the major axis being greater than the distance between the interior surface and exterior surface on the minor axis to give rigidity to said tube and to lessen the possibility of a kink in said tube; forming said tube to be of one piece unitary construction; selecting said elastomer to have the following characteristics:

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175; | and forming a reinforcing braid between said exterior surface and said interior surface.

A tube for conveying a liquid made by a process comprising extruding said tube to have in an end view a wall encircling a passageway and defining a passageway; and in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; and extruding said tube to be of a one piece unitary construction.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; extruding said tube to be of a one piece unitary construction; and said tube being an elastomer plastic having characteristics

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to be of a generally rectangular configuration and having a bottom side and a spaced apart top side; a first curved end joined to said bottom side and to said top side; said first curved end formed to have an exterior surface; a second curved end joined to said bottom side and to said top side and to have an exterior surface; a first outrigger formed on said first curved end; a second outrigger formed on said second curved end; said bottom side, said first curved end said top side, said second curved end, said first outrigger, and said second outrigger formed to be continuous; and said first outrigger and said second outrigger formed to lessen the possibility of a kink in the tube.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to be of a generally rectangular configuration and having a bottom side and a spaced apart top side; a first curved end joined to said bottom side and to said top side; said first curved end formed to have an exterior surface; a second curved end joined to said bottom side and to said top side and to have an exterior surface; a first outrigger formed on said first curved end; a second outrigger formed on said second curved end; said bottom side, said first curved end said top side, said second curved end, said first outrigger, and said second outrigger formed to be continuous; said first outrigger and said second outrigger formed to lessen the possibility of a kink in the tube; and said tube formed to be of one piece unitary construction.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to be of a generally rectangular configuration and having a bottom side and a spaced apart top side; a first curved end joined to said bottom side and to said top side; said first curved end formed to have an exterior surface; a second curved end joined to said bottom side and to said top side and to have an exterior surface; a first outrigger formed on said first curved end; a second outrigger formed on said second curved end; said bottom side, said first curved end said top side, said second curved end, said first outrigger, and said second outrigger formed to be continuous; said first outrigger and said second outrigger formed to lessen the possibility of a kink in the tube; and selecting said elastomer to have the following characteristics:

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175 |

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally rectangular configuration having a bottom side and a spaced apart top side; a first curved end formed to join said bottom side and said top side; said first curved end formed to have an exterior surface; a second curved end formed to join said bottom side and said top side and to have an exterior surface; on the outer surface of said first curved end forming a first outrigger; on the outer surface of said second curved end forming a second outrigger; said bottom side, said first curved end, said top side, said second curved end, said first outrigger, and said second outrigger formed to be be continuous and to have an inner surface; said first outrigger and said second outrigger formed to lessen the possibility of a kink in the tube; and a divider connected with said inner surface to define a first channel and a second channel in said tube.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally rectangular configuration having a bottom side and a spaced apart top side; a first curved end formed to join said bottom side and said top side; said first curved end formed to have an exterior surface; a second curved end formed to join said bottom side and said top side and to have an exterior surface; on the outer surface of said first curved end forming a first outrigger; on the outer surface of said second curved end forming a second outrigger; said bottom side, said first curved end, said top side, said second curved end, said first outrigger, and said second outrigger formed to be be continuous and to have an inner surface; said first outrigger and said second outrigger formed to lessen the possibility of a kink in the tube; a divider connected with said inner surface to define a first channel and a second channel in said tube; and said tube formed to be one piece unitary construction.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally rectangular configuration having a bottom side and a spaced apart top side; a first curved end formed to join said bottom side and said top side; said first curved end formed to have an exterior surface; a second curved end formed to join said bottom side and said top side and to have an exterior surface; on the outer surface of said first curved end forming a first outrigger; on the outer surface of said second curved end forming a second outrigger; said bottom side, said first curved end, said top side, said second curved end, said first outrigger, and said second outrigger formed to be be continuous and to have an inner surface; said first outrigger and said second outrigger formed to lessen the possibility of a kink in the tube; a divider connected with said inner surface to define a first channel and a second channel in said tube; said tube formed to be one piece unitary construction; and selecting said elastomer to have the following characteristics:

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally circular configuration; said tube formed to have an exterior surface; a first outrigger formed on said exterior surface; and a second outrigger formed on said exterior surface to give rigidity to said tube and to lessen the possibility of a kink in said tube.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally circular configuration; said tube formed to have an exterior surface; a first outrigger formed on said exterior surface; a second outrigger formed on said exterior surface to give rigidity to said tube and to lessen the possibility of a kink in said tube; and said first outrigger and said second outrigger formed to be approximately 180 degrees apart.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally circular configuration; said tube formed to have an exterior surface; a first outrigger formed on said exterior surface; a second outrigger formed on said exterior surface to give rigidity to said tube and to lessen the possibility of a kink in said tube; and said first outrigger and said second outrigger formed to be less than 180 degrees apart.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally circular configuration; said tube formed to have an exterior surface; a first outrigger formed on said exterior surface; a second outrigger formed on said exterior surface to give rigidity to said tube and to lessen the possibility of a kink in said tube; and said tube formed to be of a one piece unitary construction.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube, in an end view, formed to be of a generally circular configuration; said tube formed to have an exterior surface; a first outrigger formed on said exterior surface; a second outrigger formed on said exterior surface to give rigidity to said tube and to lessen the possibility of a kink in said tube; and selecting said elastomer to have the following characteristics:

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to be of a generally rectangular configuration having a bottom side and a spaced apart top side; a first curved end joined to said bottom side and to said top side; said first curved end formed to have an exterior surface; a second curved end joined to said bottom side and to said top side and to have an exterior surface; said first curved end formed to be thicker than said bottom side and to be thicker than said top side to give rigidity to said tube and to lessen the possibility of a kink in said tube; said second curved end formed to be thicker than said bottom side and to be thicker than said top side to give rigidity to said tube and to lessen the possibility of a kink in said tube; said bottom side, said top side, said first curved end, and said second curved end formed to have an inner surface; and a divider connected with said inner surface of the top side and with said inner surface of the bottom side to define a first channel and a second channel in said tube.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to be of a generally rectangular configuration having a bottom side and a spaced apart top side; a first curved end joined to said bottom side and to said top side; said first curved end formed to have an exterior surface; a second curved end joined to said bottom side and to said top side and to have an exterior surface; said first curved end formed to be thicker than said bottom side and to be thicker than said top side to give rigidity to said tube and to lessen the possibility of a kink in said tube; said second curved end formed to be thicker than said bottom side and to be thicker than said top side to give rigidity to said tube and to lessen the possibility of a kink in said tube; said bottom side, said top side, said first curved end, and said second curved end formed to have an inner surface; a divider connected with said inner surface of the top side and with said inner surface of the bottom side to define a first channel and a second channel in said tube; and said tube formed to be one piece unitary construction.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to be of a generally rectangular configuration having a bottom side and a spaced apart top side; a first curved end joined to said bottom side and to said top side; said first curved end formed to have an exterior surface; a second curved end joined to said bottom side and to said top side and to have an exterior surface; said first curved end formed to be thicker than said bottom side and to be thicker than said top side to give rigidity to said tube and to lessen the possibility of a kink in said tube; said second curved end formed to be thicker than said bottom side and to be thicker than said top side to give rigidity to said tube and to lessen the possibility of a kink in said tube; said bottom side, said top side, said first curved end, and said second curved end formed to have an inner surface; a divider connected with said inner surface of the top side and with said inner surface of the bottom side to define a first channel and a second channel in said tube; and selecting said elastomer to have the following characteristics:

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to have an exterior surface; said tube formed to have an interior surface around said passageway; a reinforcing braid positioned between said exterior surface and said interior surface.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to have an exterior surface; said tube formed to have an interior surface around said passageway; a reinforcing braid positioned between said exterior surface and said interior surface and selecting said elastomer to have the following characteristics:

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube formed to have an exterior surface and in cross-section to be of an elliptical configuration; said tube formed to have an interior surface around said passageway; and said tube formed to have the distance between the interior surface and the exterior surface on the major axis being greater than the distance between the interior surface and exterior surface on the minor axis to give rigidity to said tube and to lessen the possibility of a kink in said tube.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; and said tube being formed to be one piece unitary construction.

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube being formed to be one piece unitary construction; and selecting said elastomer to have the following characteristics:

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |

-continued

|  | low | high |
| --- | --- | --- |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A tube for conveying a liquid made by a process comprising extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; said tube being formed to be one piece unitary construction; selecting said elastomer to have the following characteristics:

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175; | and a reinforcing braid positioned between said exterior surface and said interior surface.

A member of a clamp, said member comprising said member being of a rectangular configuration having an outer surface and an inner surface; in said inner surface a main central longitudinal groove; in said inner surface a first outrigger groove juxtapositioned to said longitudinal groove; and in said inner surface a second outrigger groove juxtapositioned to said longitudinal groove.

A clamp comprising a first member and a second member each of said members being of a rectangular configuration having an outer surface and an inner surface; in said inner surface a main central longitudinal groove; in said inner surface a first outrigger groove juxtapositioned to said longitudinal groove; in said inner surface a second outrigger groove juxtapositioned to said longitudinal groove; and the inner surface of said first member and the inner surface of said second member juxtapositioned to each other to define a main central longitudinal groove, a first outrigger groove, and a second outrigger groove.

A clamp comprising a first member and a second member each of said members being of a rectangular configuration having an outer surface and an inner surface; in said inner surface a main central longitudinal groove; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a main central longitudinal groove, a first outrigger groove, and a second outrigger groove; and a means for juxtapositioning said first member and said second member.

A clamp comprising a first member and a second member each of said members being of a rectangular configuration having an outer surface and an inner surface; in said inner surface a main central longitudinal groove; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a main central longitudinal groove, a first outrigger groove, and a second outrigger groove; a means for juxtapositioning said first member and said second member; two spaced-apart passageways in each member; the spaced-apart passageway being aligned; and two self-tapping screws in said passageways and joining said clamps to form said clamp.

A process for forming a member of a clamp and comprising forming said member to be of a rectangular configuration having an outer surface and an inner surface; forming in said inner surface a main central longitudinal groove; forming in said inner surface a first outrigger groove juxtapositioned to said longitudinal groove; and forming in said inner surface a second outrigger groove juxtapositioned to said longitudinal groove.

A member of a clamp formed by the process comprising said member being formed in a rectangular configuration having an outer surface and an inner surface; in said inner surface forming a main central longitudinal groove; in said inner surface forming a first outrigger groove juxtapositioned to said longitudinal groove; and in said inner surface forming a second outrigger groove juxtapositioned to said longitudinal groove.

A process for forming a clamp comprising a first member and a second member, said process comprising forming each of said members to be of a rectangular configuration having an outer surface and an inner surface; forming in said inner surface a main central longitudinal groove; forming in said inner surface a first outrigger groove juxtapositioned to said longitudinal groove; forming in said inner surface a second outrigger groove juxtapositioned to said longitudinal groove; and juxtapositioning the inner surface of said first member and the inner surface of said second member to each other to define a large main central longitudinal groove, a large first outrigger groove, and a large second outrigger groove.

A process for forming a clamp comprising a first member and a second member, said process comprising forming each of said members to be of a rectangular configuration having an outer surface and an inner surface; forming in said inner surface a main central longitudinal groove; forming in said inner surface a first outrigger groove juxtapositioned to said longitudinal groove; forming in said inner surface a second outrigger groove juxtapositioned to said longitudinal groove; juxtapositioning the inner surface of said first member and the inner surface of said second member to each other to define a large main central longitudinal groove, a large first outrigger groove, and a large second outrigger groove; and forming a means for juxtapositioning said first member and said second member.

A process for forming a clamp comprising a first member and a second member, said process comprising forming each of said members to be of a rectangular configuration having an outer surface and an inner surface; forming in said inner surface a main central longitudinal groove; forming in said inner surface a first outrigger groove juxtapositioned to said longitudinal groove; forming in said inner surface a second outrigger groove juxtapositioned to said longitudinal groove; juxtapositioning the inner surface of said first member and the inner surface of said second member to each other to define a large main central longitudinal groove, a large first outrigger groove, and a large second outrigger groove; forming a means for juxtapositioning said first member and said second member; forming two spaced-apart passageways in each member; forming the spaced-apart passageway being aligned; and positioning two self-tapping screws in said passageways joining said members to form said clamp.

A clamp comprising a first member and a second member and made by a process comprising each of said members formed to be of a rectangular configuration having an outer surface and an inner surface; a main central longitudinal groove formed in said inner surface; a first outrigger groove formed in said inner surface and juxtapositioned to said longitudinal groove; in said inner surface a second outrigger groove juxtapositioned to said longitudinal groove; and the inner surface of said first member and the inner surface of said second member juxtapositioned to each other to define a large main central longitudinal groove, a large first outrigger groove, and a large second outrigger groove.

A clamp comprising a first member and a second member and made by a process comprising each of said members formed to be of a rectangular configuration having an outer surface and an inner surface; a main central longitudinal groove formed in said inner surface; a first outrigger groove formed in said inner surface and juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; and forming a means for juxtapositioning said first member and said second member.

A clamp comprising a first member and a second member and made by a process comprising each of said members formed to be of a rectangular configuration having an outer surface and an inner surface; a main central longitudinal groove formed in said inner surface; a first outrigger groove formed in said inner surface and juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; forming a means for juxtapositioning said first member and said second member; two spaced-apart passageways formed in each member; said two spaced-apart passageways being aligned; and positioning two self-tapping screws in said passageways for joining said members to form said clamp.

A nozzle in the configuration of a frustrum of a cone and comprising said nozzle having an inner end with an inner opening; said nozzle having an outer end with an outer opening; said inner opening being larger than said outer opening; and said nozzle being of a flexible material which can be easily manipulated for controlling the flow of liquid flowing outwardly of the nozzle.

A nozzle in the configuration of a frustrum of a cone and comprising said nozzle having an inner end with an inner opening; said nozzle having an outer end with an outer opening; said inner opening being larger than said outer opening; said nozzle being of a flexible material which can be easily manipulated for controlling the flow of liquid flowing outwardly of the nozzle; said nozzle having a longitudinal axis; said outer end being at an angle of about 45 degrees to said longitudinal axis; and said outer opening being in the configuration of an ellipse.

A nozzle in the configuration of a frustrum of a cone and comprising said nozzle having an inner end with an inner opening; said nozzle having an outer end with an outer opening; said inner opening being larger than said outer opening; said nozzle being of a flexible material which can be easily manipulated for controlling the flow of liquid flowing outwardly of the nozzle; said nozzle having a longitudinal axis; said outer end being at an angle of about 45 degrees to said longitudinal axis; said outer opening being in the configuration of an ellipse; and said nozzle on its inner end connects with an inlet adaptor.

A process for making a nozzle in the configuration of a frustrum of a cone, said process comprising forming said nozzle to have an inner end with an inner opening; forming said nozzle to have an outer end with an outer opening; forming said inner opening being larger than said outer opening; and forming said nozzle of a flexible material for ease of manipulation for controlling the flow of liquid flowing outwardly of the nozzle.

A process for making a nozzle in the configuration of a frustrum of a cone, said process comprising forming said nozzle to have an inner end with an inner opening; forming said nozzle to have an outer end with an outer opening; forming said inner opening being larger than said outer opening; and forming said nozzle of a flexible material for ease of manipulation for controlling the flow of liquid flowing outwardly of the nozzle; forming said nozzle to have a longitudinal axis; forming said outer end to be at an angle of about 45 to said longitudinal axis; and forming said outer opening to be in the configuration of an ellipse.

A process for making a nozzle in the configuration of a frustrum of a cone, said process comprising forming said nozzle to have an inner end with an inner opening; forming said nozzle to have an outer end with an outer opening; forming said inner opening being larger than said outer opening; and forming said nozzle of a flexible material for ease of manipulation for controlling the flow of liquid flowing outwardly of the nozzle; forming said nozzle to have a longitudinal axis; forming said outer end to be at an angle of about 45 to said longitudinal axis; forming said outer opening to be in the configuration of an ellipse; and forming said nozzle on its inner end for connection with an inlet adaptor.

A nozzle in the configuration of a frustrum of a cone and made by a process comprising said nozzle formed to have an inner end with an inner opening; said nozzle formed to have an outer end with an outer opening; said inner opening formed to be larger than said outer opening; and said nozzle formed of a flexible material for ease of manipulation for controlling the flow of liquid flowing outwardly of said nozzle.

A nozzle in the configuration of a frustrum of a cone and made by a process comprising said nozzle formed to have an inner end with an inner opening; said nozzle formed to have an outer end with an outer opening; said inner opening formed to be larger than said outer opening; said nozzle formed of a flexible material for ease of manipulation for controlling the flow of liquid flowing outwardly of said nozzle; said nozzle formed to have a longitudinal axis; said outer end formed to be at an angle of about 45 degrees to said longitudinal axis; and said outer opening formed to be in the configuration of an ellipse.

A nozzle in the configuration of a frustrum of a cone and made by a process comprising said nozzle formed to have an inner end with an inner opening; said nozzle formed to have an outer end with an outer opening; said inner opening formed to be larger than said outer opening; said nozzle formed of a flexible material for ease of manipulation for controlling the flow of liquid flowing outwardly of said nozzle; said nozzle formed to have a longitudinal axis; said outer end formed to be at an angle of about 45 degrees to said longitudinal axis; said outer opening formed to be in the configuration of an ellipse; and said nozzle on its inner end formed to connect with an inlet adaptor.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; and said tube being in said clamp with said passageway being in said large main central longitudinal groove and said large first outrigger being in said first outrigger groove and said second outrigger being in said large second outrigger groove.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; and said tube being of one piece unitary construction.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; and said tube being an elastomer plastic having characteristics

|  | low | high |
|---|---|---|
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; an inlet adaptor comprising an inlet attachment and an outlet nozzle; and said outlet nozzle being in said large main central outlet groove.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; an inlet adaptor comprising an inlet attachment and an outlet nozzle; said outlet nozzle being in said large main central outlet groove; and said inlet attachment being tapped.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; and an outlet attachment in said large main central outlet groove and extending outside of said clamp.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; an outlet attachment in said large main central outlet groove and extending outside of said clamp; and said outlet attachment being externally threaded.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; an outlet attachment in said large main central outlet groove and extending outside of said clamp; a nozzle in the configuration of a frustrum of a cone and positioned on an outlet attachment; said nozzle having an inner end with an inner opening; said nozzle having an outer end with an outer opening; said inner opening being larger than said outer opening; and said nozzle being of a flexible material which can be easily manipulated for controlling the flow of liquid flowing outwardly of the nozzle.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube; said tube being in said clamp with said passageway being in said large main central longitudinal groove and said large first outrigger being in said first outrigger groove and said second outrigger being in said large second outrigger groove; an outlet attachment in said large main central outlet groove and extending outside of said clamp; a nozzle in the configuration of a frustrum of a cone and positioned on an outlet attachment; said nozzle having an inner end with an inner opening; said nozzle having an outer end with an outer opening; said inner opening being larger than said outer opening; said nozzle being of a flexible material which can be easily manipulated for controlling the flow of liquid flowing outwardly of the nozzle; said nozzle having a longitudinal axis; said outer end being at an angle of about 45 degrees to said longitudinal axis; and said outer opening being in the configuration of an ellipse.

A combination of a clamp and a tube for conveying a liquid and comprising said clamp comprising a first member and a second member each of said members being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; the inner surface of said first member and the inner surface of said second member juxtapositioned to each other to define a large main central longitudinal groove, a large first outrigger groove, and a large second outrigger groove; said tube comprising said tube in an end view comprising a wall encircling a passageway and defining a passageway; in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube; said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; said bottom side, said first curved end, said top side, said second curved end, said first outrigger, and said second outrigger being continuous; said first outrigger and said second outrigger lessen the possibility of a kink in the tube;

said tube being in said clamp with said passageway being in said large main central longitudinal groove and said large first outrigger being in said first outrigger groove and said second outrigger being in said large second outrigger groove; an outlet attachment in said large main central outlet groove and extending outside of said clamp; a nozzle in the configuration of a frustrum of a cone and positioned on an outlet attachment; said nozzle having an inner end with an inner opening; said nozzle having an outer end with an outer opening; said inner opening being larger than said outer opening; said nozzle being of a flexible material which can be easily manipulated for controlling the flow of liquid flowing outwardly of the nozzle; said nozzle having a longitudinal axis; said outer end being at an angle of about 45 degrees to said longitudinal axis; said outer opening being in the configuration of an ellipse; and said nozzle on its inner end connects with an outlet attachment.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube;

juxtapositioning the inner surface of said first member and the inner surface of said second member to each other to define a large main central longitudinal groove, a large first outrigger groove, and a large second outrigger groove; and said tube being in said clamp with said passageway being in said main central longitudinal groove and said first outrigger being in said large first outrigger groove, and said second outrigger being in said large second outrigger groove.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; and extruding said tube to be of a one piece unitary construction.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; extruding said tube to be of a one piece unitary construction; and forming said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; selecting an inlet adaptor comprising an inlet attachment and an outlet nozzle; and positioning said outlet nozzle in said large main central outlet groove.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; and positioning an outlet attachment in said large main central groove and with part of said outlet attachment extending outside of said clamp.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; and forming said nozzle to be of a flexible material which can be easily manipulated for controlling the flow of liquid flowing outwardly of the nozzle.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; forming said nozzle to be of a flexible material which can be easily manipulated for controlling the flow of liquid flowing outwardly of the nozzle; forming said nozzle to have a longitudinal axis; forming said outer end to be at an angle of about 45 degrees to said longitudinal axis; and forming said outer opening to be in the configuration of an ellipse.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; forming said nozzle to be of a flexible material which can be easily manipulated for controlling the flow of liquid flowing outwardly of the nozzle; forming said nozzle to have a longitudinal axis; forming said outer end to be at an angle of about 45 degrees to said longitudinal axis; forming said outer opening to be in the configuration of an ellipse; and forming said nozzle on its inner end to connect with an inlet adaptor.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; forming said nozzle to be of a flexible material which can be easily manipulated for controlling the flow of liquid flowing outwardly of the nozzle; forming said nozzle to have a longitudinal axis; forming said outer end to be at an angle of about 45 degrees to said longitudinal axis; forming said outer opening to be in the configuration of an ellipse; and forming said nozzle on its inner end to connect with an inlet adaptor.

A process for forming a combination of a clamp and a tube for conveying a liquid and comprising said clamp comprising a first member and a second member a process for forming said member and comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous and unitary; forming said first outrigger and said second outrigger to lessen the possibility of a kink in the tube; juxtapositioning the inner surface of said first member and the inner surface of said second member to each other to define a large main central longitudinal groove, a large first outrigger groove, and a large second outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; forming said nozzle to be of a flexible material which can be easily manipulated for controlling the flow of liquid flowing outwardly of the nozzle; forming said nozzle to have a longitudinal axis; forming said outer end to be at an angle of about 45 degrees to said longitudinal axis; forming said outer opening to be in the configuration of an ellipse; forming said nozzle on its inner end to connect with an inlet adaptor; and positioning said nozzle on said outlet attachment.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; and said tube being in said clamp with said passageway being in said main central longitudinal groove and said first outrigger being in said large first outrigger groove, and said second outrigger being in said large second outrigger groove.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; and said tube being extruded and of one piece unitary construction.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; said tube being extruded and of one piece unitary construction; and forming said tube of an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; selecting an inlet adaptor comprising an inlet attachment and an outlet nozzle; and positioning said outlet nozzle in said main central outlet groove.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; and positioning an outlet attachment in said large main central groove and with part of said outlet attachment extending outside of said clamp.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; and forming said nozzle to be of a flexible material which can be easily manipulated for controlling the flow of liquid flowing outwardly of the nozzle.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; forming said nozzle to be of a flexible material which can be easily manipulated for controlling the flow of liquid flowing outwardly of the nozzle; forming said nozzle to have a longitudinal axis; forming said outer end to be at an angle of about 45 degrees to said longitudinal axis; and forming said outer opening to be in the configuration of an ellipse.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; forming said nozzle to be of a flexible material which can be easily manipulated for controlling the flow of liquid flowing outwardly of the nozzle; forming said nozzle to have a longitudinal axis; forming said outer end to be at an angle of about 45 degrees to said longitudinal axis; forming said outer opening to be in the configuration of an ellipse; and forming said nozzle, on its inner end, to connect with an inlet adaptor.

A combination of a clamp and a tube for conveying a liquid and made by a process comprising said clamp comprising a first member and a second member; said member made by a process comprising said member being of a rectangular configuration having an outer surface and an inner surface; in said inner surface a main central longitudinal groove having a first side and a second side; in said inner surface a first outrigger groove juxtapositioned to said longitudinal groove; in said inner surface a second outrigger groove juxtapositioned to said longitudinal groove; a process for forming said tube: extruding said tube to have in an end view a wall encircling a passageway and defining a passageway; in a clockwise direction and, at approximately 0 degrees and 180 degrees to have a thicker wall than the wall between 0 degrees and 180 degrees and between 180 degrees and 0 degrees to give rigidity to said tube and to lessen the possibility of a kink in said tube; forming said tube to be of a generally rectangular configuration having a bottom side and a spaced apart top side; joining a first curved end to said bottom side and to said top side; forming said first curved end to have an exterior surface; joining a second curved end to said bottom side and to said top side and to have an exterior surface; forming a first outrigger on said first curved end; forming a second outrigger on said second curved end; forming said bottom side, said first curved end said top side, said second curved end, said first outrigger, and said second outrigger to be continuous; forming said first outrigger and said second outrigger to lessen the possibility of a kink in the tube; juxtapositioning the inner surface of said first member and the inner surface of said second member juxtapositioned to each other to define a large main central longitudinal groove, a large first outrigger groove, and a second large outrigger groove; said tube being in said clamp with said passageway being in said main central longitudinal groove and said first outrigger being in said large first outrigger groove, and said second outrigger being in said large second outrigger groove; positioning an outlet attachment in said large main central groove and with part of said outlet attachment extending outside of said clamp; forming said nozzle to have an inner end with an inner opening; forming said nozzle to have an outer end with an outer opening; forming said inner opening to be larger than said outer opening; forming said nozzle to be of a flexible material which can be easily manipulated for controlling the flow of liquid flowing outwardly of the nozzle; forming said nozzle to have a longitudinal axis; forming said outer end to be at an angle of about 45 degrees to said longitudinal axis; forming said outer opening to be in the configuration of an ellipse; forming said nozzle, on its inner end, to connect with an inlet adaptor; and positioning said nozzle on said outlet attachment.

A tube according to claim 1 and comprising said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; and an outrigger passageway in at least one of said outriggers.

A tube according to claim 1 and comprising said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; an outrigger passageway in at least one of said outriggers; and said bottom side, said first curved end, said top side, said second curved end, said first outrigger, and said second outrigger being continuous and unitary.

A tube according to claim 1 and comprising said tube in an end view being of a generally rectangular configuration having a bottom side and a spaced apart top side; a first curved end joining said bottom side and said top side; said first curved end having an exterior surface; a second curved end joining said bottom side and said top side and having an exterior surface; on the outer surface of said first curved end a first outrigger; on the outer surface of said second curved end a second outrigger; an outrigger passageway in at least one of said outriggers; and a stiffening rod in said outrigger passageway.

A process for making a tube for conveying a liquid according to claim 10 and comprising forming said thicker wall at approximately 0 degrees to be a first outrigger; forming said thicker wall at approximately 180 degrees to be a second outrigger; and forming an outrigger passageway in at least one of said outriggers.

A process for making a tube for conveying a liquid according to claim 10 and comprising forming said thicker wall at approximately 0 degrees to be a first outrigger; forming said thicker wall at approximately 180 degrees to be a second outrigger; forming an outrigger passageway in at least one of said outriggers; and positioning a stiffening rod in said outrigger passageway.

A tube for conveying a liquid made by a process according to claim 13 and comprising forming said thicker wall at approximately 0 degrees to be a first outrigger; forming said thicker wall at approximately 180 degrees to be a second outrigger; forming an outrigger passageway in at least one of said outriggers.

A tube for conveying a liquid made by a process according to claim 13 and comprising forming said thicker wall at approximately 0 degrees to be a first outrigger; forming said thicker wall at approximately 180 degrees to be a second outrigger; forming an outrigger passageway in at least one of said outriggers; and positioning a stiffening rod in said outrigger passageway.

A process for making a tube for conveying a liquid according to claim 10 and comprising forming said thicker wall at approximately 0 degrees to be a first outrigger; forming said thicker wall at approximately 180 degrees to be a second outrigger; forming an outrigger passageway in at least one of said outriggers; and forming said tube to be one piece and unitary.

A process for making a tube for conveying a liquid according to claim 10 and comprising forming said thicker wall at approximately 0 degrees to be a first outrigger; forming said thicker wall at approximately 180 degrees to be a second outrigger; forming an outrigger passageway in at least one of said outriggers; and positioning a stiffening rod in said outrigger passageway.

What I claim is:

1. A tube for conveying a liquid and comprising:
   a. said tube in an end view comprising a wall encircling a passageway and thereby defining said passageway;
   b. in a clockwise direction at approximately 0 degrees and 180 degrees said wall is thicker than the wall between 0 degrees and 180 degrees and between 180 degrees and 0 degrees to give rigidity to said tube and to lessen the possibility of a kink in said tube;
   c. said tube being of one piece unitary construction; and,
   d. said tube being an elastomer plastic having characteristics

|  | low | high |
| --- | --- | --- |
| specific gravity | 1.28 | 1.38 |
| shore "D" hardness | 74 | 86 |
| 1Z0 D impact foot pounds | 21.5 c | 25.5 c |
|  | OC 17 | OC 21 |
| tensile strength psi | 5700 | 6500 |
| tensile modulus psi | 320,000 | 370,000 |
| flexural strength | 10,800 | 13,200 |
| flexural modulus | 340,000 | 400,000 |
| heat distortion | 143 | 175. |

2. A tube according to claim 1 and comprising:
   a. said tube in an end view being of a generally rectangular configuration having a bottom side and a spaced apart top side;
   b. a first curved end joining said bottom side and said top side;
   c. said first curved end having an exterior surface;
   d. a second curved end joining said bottom side and said top side and having an exterior surface;
   e. on the outer surface of said first curved end a first outrigger;
   f. on the outer surface of said second curved end a second outrigger;
   g. said bottom side, said first curved end, said top side, said second curved end, said first outrigger, and said second outrigger being continuous; and
   h. said first outrigger and said second outrigger lessen the possibility of a kink in the tube.

3. A tube according to claim 1 and comprising:
   a. said tube in an end view being of a generally rectangular configuration having a bottom side and a spaced apart top side;
   b. a first curved end joining said bottom side and said top side;
   c. said first curved end having an exterior surface;
   d. a second curved end joining said bottom side and said top side and having an exterior surface;
   e. on the outer surface of said first curved end a first outrigger;
   f. on the outer surface of said second curved end a second outrigger;
   g. said bottom side, said first curved end, said top side, said second curved end, said first outrigger, and said second outrigger being continuous;
   h. said first outrigger and said second outrigger lessen the possibility of a kink in the tube;
   i. said bottom side having a first inner surface;
   j. said top side having a second inner surface; and
   k. a divider connecting with said first inner surface and with said second inner surface to define a first channel and a second channel in said tube.

4. A tube according to claim 1 and comprising:
   a. said tube in an end view being of a generally circular configuration;
   b. said tube having an exterior surface;
   c. on said exterior surface a first outrigger; and
   d. on said exterior surface a second outrigger to give rigidity to said tube and to lessen the possibility of a kink in said tube.

5. A tube according to claim 1 and comprising:
   a. said tube in an end view being of a generally rectangular configuration having a bottom side and a spaced apart top side;
   b. a first curved end joining said bottom side and said top side;
   c. a second curved end joining said bottom side and said top side and having an exterior surface;
   d. said first curved end being thicker than said bottom side and thicker than said top side to give rigidity to said tube and to lessen the possibility of a kink in said tube;
   e. said second curved end being thicker than said bottom side and thicker than said top side to give rigidity to said tube and to lessen the possibility of a kink in said tube;
   f. said bottom side having a first inner surface;
   j. said top side having a second inner surface; and
   k. a divider connecting with said first inner surface and with said second inner surface to define a first channel and a second channel in said tube.

6. A tube according to claim 1 and comprising:
   a. said tube having an exterior surface;
   b. said tube having an interior surface around said passageway; and
   c. a reinforcing braid between said exterior surface and said interior surface.

7. A tube according to claim 1 and comprising:
   a. in cross-section the exterior surface being of an elliptical configuration;
   b. said tube surrounding said passageway defining an interior surface;
   c. the distance between the interior surface and the exterior surface on the major axis being greater than the distance between the interior surface and exterior surface on the minor axis to give rigidity to said tube and to lessen the possibility of a kink in said tube.

8. A tube according to claim 1 and comprising:
   a. said tube in an end view being of a generally rectangular configuration having a bottom side and a spaced apart top side;
   b. a first curved end joining said bottom side and said top side;
   c. said first curved end having an exterior surface;

d. a second curved end joining said bottom side and said top side and having an exterior surface;
e. on the outer surface of said first curved end a first outrigger;
f. on the outer surface of said second curved end a second outrigger; and
g. an outrigger passageway in at least one of said outriggers.

9. A tube according to claim 8 and comprising:
a. a stiffening rod in said outrigger passageway.

* * * * *